(12) United States Patent
Matsutani et al.

(10) Patent No.: US 8,370,739 B2
(45) Date of Patent: Feb. 5, 2013

(54) COMBINING MULTIPLE IMAGES FROM DIFFERENT DISPLAY AREAS USING A PLURALITY OF REFERENCE POSITIONS

(75) Inventors: Tetsuro Matsutani, Nagoya (JP); Tetsuya Kato, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 932 days.

(21) Appl. No.: 12/413,333

(22) Filed: Mar. 27, 2009

(65) Prior Publication Data

US 2009/0244094 A1 Oct. 1, 2009

(30) Foreign Application Priority Data

Mar. 31, 2008 (JP) ................................. 2008-092150

(51) Int. Cl.
*G06F 17/24* (2006.01)
(52) U.S. Cl. ........ 715/246; 715/769; 715/770; 345/629; 345/156; 358/409; 358/453; 358/509
(58) Field of Classification Search .................. 345/156, 345/629; 358/409, 453, 509; 715/246, 764, 715/770

See application file for complete search history.

(56) References Cited

U.S. PATENT DOCUMENTS

| | | | | | |
|---|---|---|---|---|---|
| 4,667,248 | A | * | 5/1987 | Kanno ........................... | 358/452 |
| 5,442,739 | A | * | 8/1995 | Saito .............................. | 345/676 |
| 6,333,752 | B1 | * | 12/2001 | Hasegawa et al. ............. | 715/764 |
| 6,593,938 | B1 | | 7/2003 | Sakata et al. | |
| 7,330,195 | B2 | * | 2/2008 | Li .................................. | 345/629 |
| 7,423,655 | B1 | * | 9/2008 | Stephens ........................ | 345/624 |
| 7,551,211 | B2 | * | 6/2009 | Taguchi et al. ................ | 348/239 |
| 7,724,242 | B2 | * | 5/2010 | Hillis et al. .................... | 345/173 |
| 7,755,644 | B1 | * | 7/2010 | Stephens ........................ | 345/624 |
| 8,085,318 | B2 | * | 12/2011 | Ciudad et al. ................. | 348/239 |
| 2003/0184815 | A1 | * | 10/2003 | Shiki et al. ..................... | 358/453 |
| 2004/0070619 | A1 | * | 4/2004 | Yoshio et al. .................. | 345/764 |

(Continued)

FOREIGN PATENT DOCUMENTS

| | | |
|---|---|---|
| JP | H10-055436 A | 2/1998 |
| JP | 11-103385 A | 4/1999 |
| JP | H11-355556 A | 12/1999 |
| JP | 2007-181163 A | 7/2007 |
| JP | 2009-187241 A | 8/2009 |

OTHER PUBLICATIONS

Japan Patent Office, Notice of Reasons for Rejection in counterpart Patent Application No. JP 2008-092150, mailed Jul. 6, 2010.

*Primary Examiner* — Cesar Paula
*Assistant Examiner* — Mohammed-Ibrahim Zuberi
(74) *Attorney, Agent, or Firm* — Baker Botts L.L.P.

(57) ABSTRACT

An image processing apparatus includes a first display unit which displays a material image and an original image in fast and second areas on a display device, respectively; a detection unit which detects a position on the display device designated from an outside; a relationship determining unit which determines a designated position in the first area and a designated position in the second area, and which determines a correspondence relationship between the first area and the second area based on the designated positions; an allocation region determining unit which determines an allocation region in the second area; a cut region determining unit which determines a cut region in the first area to correspond to the allocation region based on the correspondence relationship; and a second display unit which displays a partial image corresponding to the cut region in the allocation region to display a combined image.

10 Claims, 17 Drawing Sheets

U.S. PATENT DOCUMENTS

| | | | |
|---|---|---|---|
| 2005/0047651 A1* | 3/2005 | Zheng | 382/162 |
| 2005/0088542 A1* | 4/2005 | Stavely et al. | 348/239 |
| 2005/0246634 A1* | 11/2005 | Ortwein et al. | 715/530 |
| 2008/0048975 A1* | 2/2008 | Leibow | 345/156 |
| 2008/0100612 A1* | 5/2008 | Dastmalchi et al. | 345/418 |
| 2008/0209311 A1* | 8/2008 | Agronik et al. | 715/234 |
| 2009/0204890 A1 | 8/2009 | Matsutani et al. | |
| 2009/0319897 A1* | 12/2009 | Kotler et al. | 715/711 |
| 2010/0053342 A1* | 3/2010 | Hwang et al. | 348/207.99 |

* cited by examiner

*FIG. 4A*
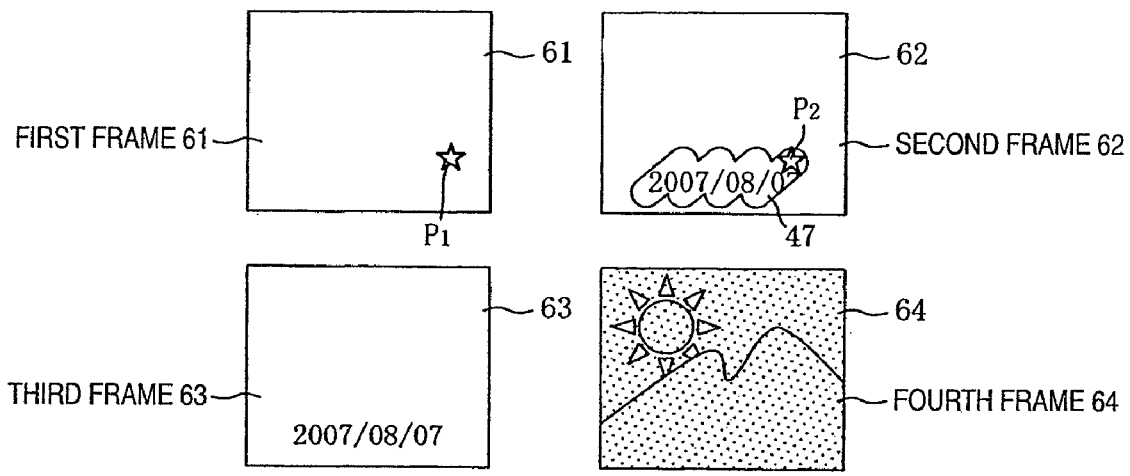
*FIG. 4B*
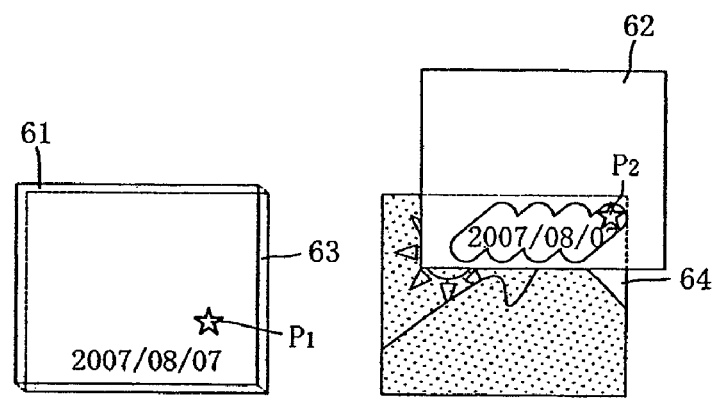
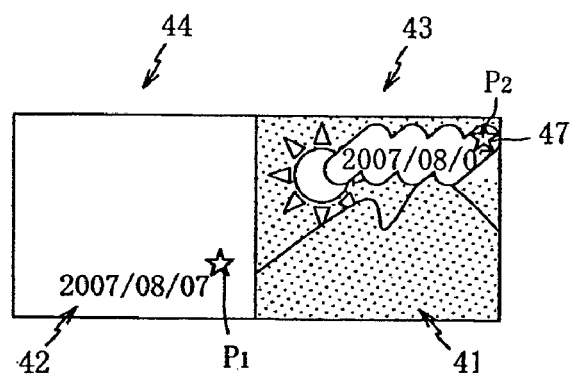

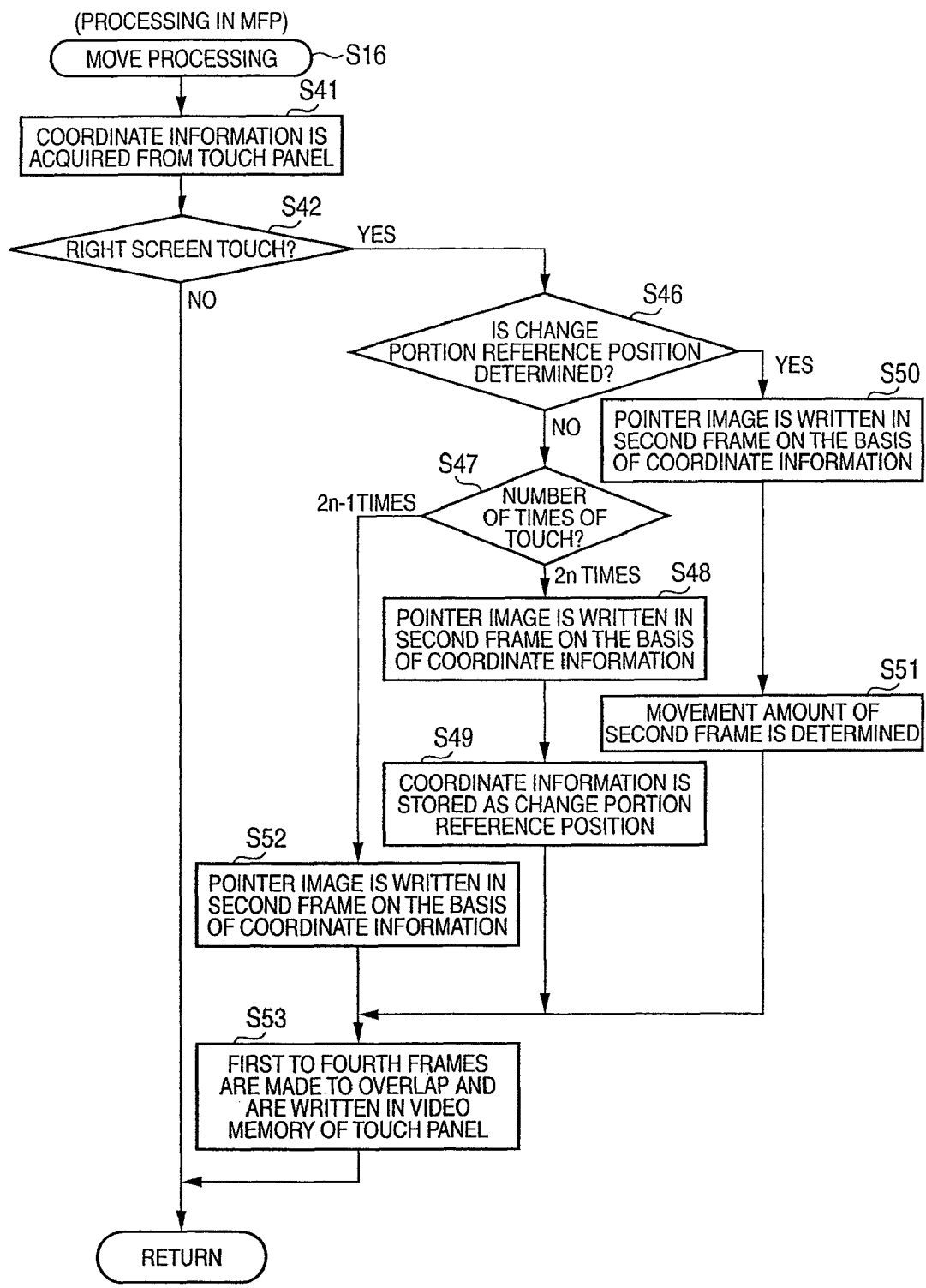

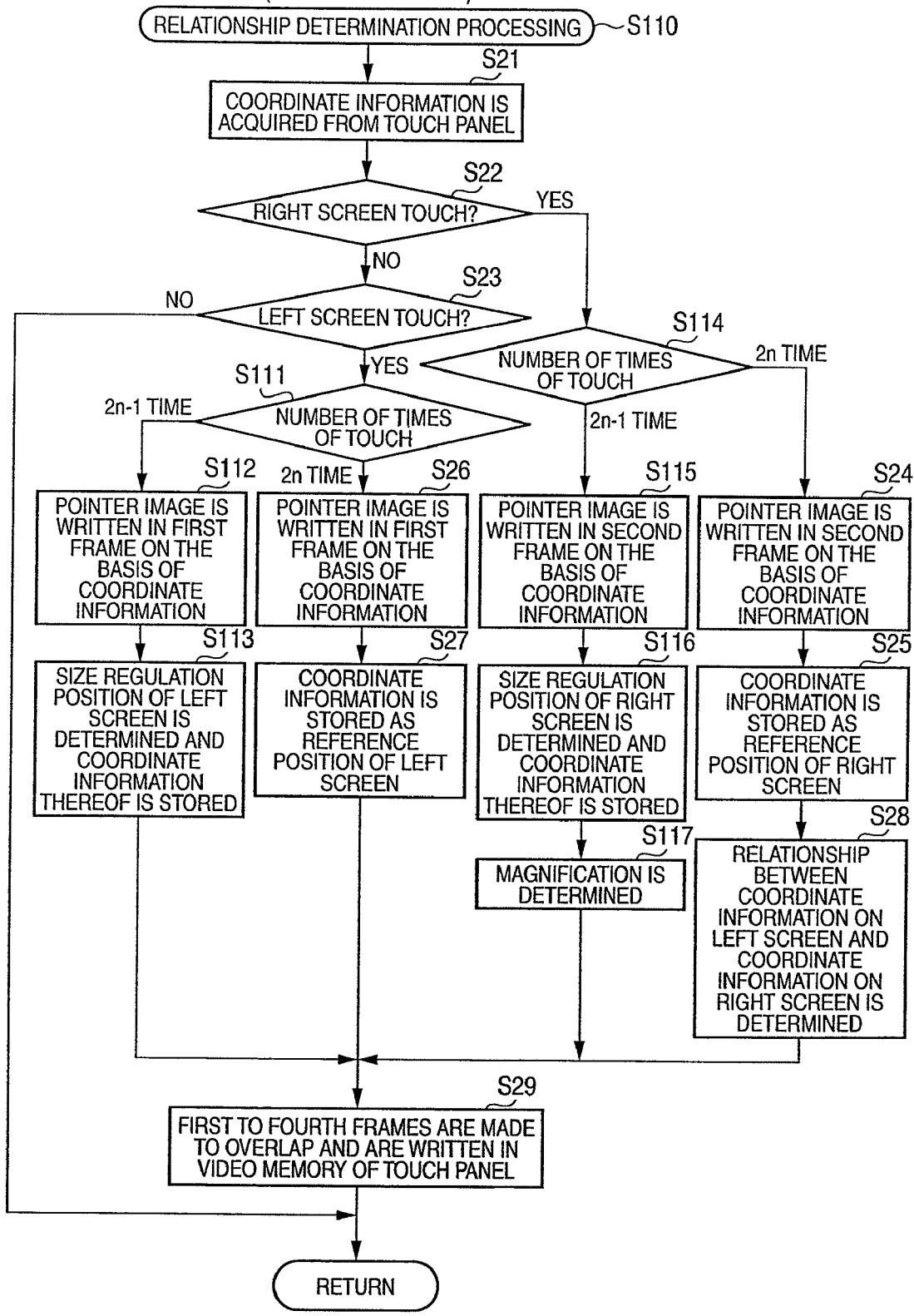

COMBINING MULTIPLE IMAGES FROM DIFFERENT DISPLAY AREAS USING A PLURALITY OF REFERENCE POSITIONS

CROSS-REFERENCE TO RELATED APPLICATION

This application claims priority from Japanese Patent Application No. 2008-092150, filed on Mar. 31, 2008, the entire subject matter of which is incorporated herein by reference.

TECHNICAL FIELD

Aspects of the present invention relate to an image processing apparatus and an image processing program.

BACKGROUND

A device has a media print function of directly printing out image data photographed by a digital camera and the like stored in a memory card by mounting the memory card in a slot provided in the device, without using a personal computer. A device is configured such that image data read from the memory card can be previewed on a display panel.

Further, a photographing apparatus, which is installed in an amusement facility and the like, automatically photographs a user in a set photo booth and prints a photographed image on print media, such as a seal, and then provides the seal to the user.

For example, JP-A-2007-181163 describes a photographing apparatus including an image arranging unit that arranges a fire image on the entire photographed image so as to overlap and an image detecting unit that deletes at least a part of the frame image arranged by the image arranging unit so that a user can edit the photographed image according to the user's preference.

However, in the apparatus described in JP-A-2007-181163, the photographed image and the frame image are displayed in a state of being combined in advance, and the user performs editing while viewing the combined state. Accordingly, for example, when the user wants to add an edit image little by little without breaking the atmosphere of the original photographed image, it becomes difficult to see the original photographed image itself.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide an image processing apparatus and an image processing program allowing a user to edit a desired combined image with a simple operation.

According to an exemplary embodiment of the present Invention, there is provided an image processing apparatus comprising: a first display unit which displays a material image in a first area on a display device and displays an original image in a second area on the display device; a detection unit which detects a position on the display device designated from an outside; a relationship determining unit which sets a designated position in the first area detected by the detection unit as a first reference position, and sets a designated position in the second area detected by the detection unit as a second reference position, and which determines a correspondence relationship between each position in the first area and each position in the second area such that the first reference position and the second reference position correspond to each other; an allocation region determining unit which determines an allocation region in the second area based on a detection result of the detection unit; a cut region determining unit which determines a cut region in the first area to correspond to the allocation region determined by the allocation region determining unit, based on the correspondence relationship determined by the relationship determining unit; and a second display unit which displays a partial image cut from the material image based on the cut region determined by the cut region determining unit. In the allocation region determined by the allocation region determining unit to display a combined image.

According to another exemplary embodiment of the present invention, there is provided a computer-readable medium having a computer program stored thereon and readable by a computer including a detection unit which detects a position on a display device designated from an outside, the computer program, when executed by the computer, causing the computer to perform operations comprising: displaying a material image in a first area on the display device, and displaying an original image in a second area on the display device; setting a designated position in the first area detected by the detection unit as a first reference position, and setting a designated position in the second area detected by the detection unit as a second reference position; determining a correspondence relationship between each position in the first area and each position in the second area such that the first reference position and the second reference position correspond to each other; determining an allocation region in the second area based on a detection result of the detection unit; determines a cut region in the first area to correspond to the allocation region based on the correspondence relationship; and displaying a partial image cut from the material image based on the cut region, in the allocation region to display a combined image.

According to the above configuration, a user can designate an arbitrary position of the first area and an arbitrary position of the second area as reference positions and can determine the correspondence relationship between each position of the first area and each position of the second area such that the reference position of the first area and the reference position of the second area correspond to each other. When an allocation region in the second area is determined on the basis of a user's operation on the second area, the cut region of the first area corresponding to the allocation region is determined. In addition, a partial image cut on the basis of the cut region is displayed in the allocation region of the second area. Therefore, an effect that the user can edit a combined image with a simple operation is obtained.

For example, the user can edit a desired combined image, in which a desired partial image cut from the material image is displayed in an allocation region of the original image, with a simple operation of designating one point of the first area, at which the partial image that the user wants to draw in the allocation region is displayed, as a reference position and designating one point of the second area, at which the user wants to provide the allocation region, as a reference position and then determining as the allocation region the neighborhood of the reference position designated previously in the second area.

BRIEF DESCRIPTION OF THE DRAWINGS

The above and other aspects of the present invention will become more apparent and more readily appreciated from the following description of exemplary embodiments of the present invention taken in conjunction with the attached drawings, in which:

FIG. 4A is a view schematically showing a first frame, a second frame, a third frame, and a fourth frame, and FIG. 4B is a view showing an image displayed on the LCD by overlapping of the first to fourth frames.

FIG. 8 is a flow chart showing move processing;

FIG. 10 is a flow chart showing relationship determination processing according to a first modified embodiment;

DETAILED DESCRIPTION

Figure 1:
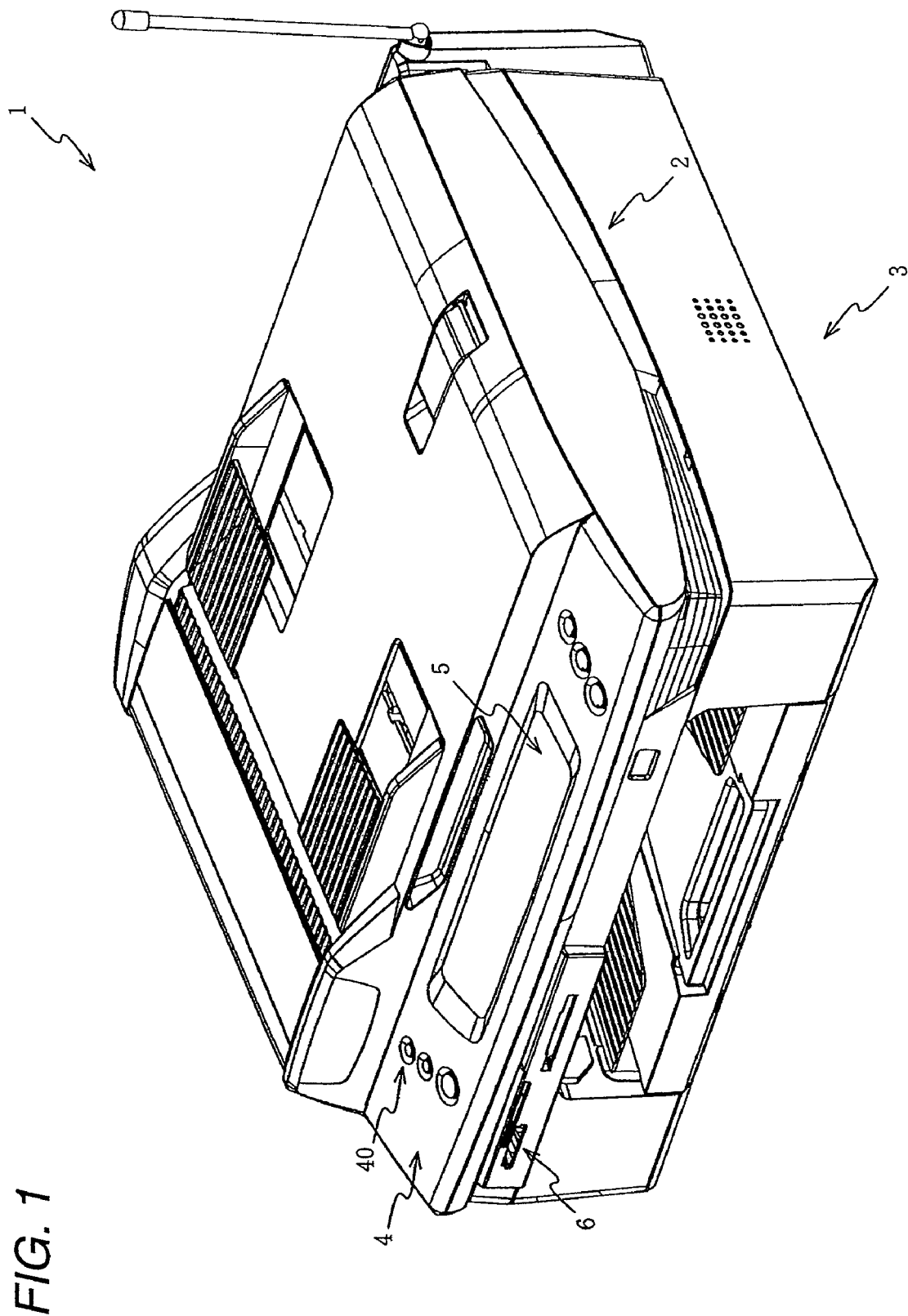
FIG. 1 is a perspective view showing the configuration of outer appearance of an MFP according to an exemplary embodiment of the present invention.

Hereinafter, exemplary embodiments of the present invention will be described with reference to the accompanying drawings. FIG. 1 is a perspective view showing the configuration of outer appearance of a multi function peripheral (hereinafter, referred to as an MFP) 1 according to an exemplary embodiment of the present invention. The MFP 1 is a multi function peripheral having various functions, such as a photo capture function, a copy function, a facsimile function, and a scanner function.

In particular, the MFP 1 according to the present exemplary embodiment is configured such that a user can edit a desired combined image in which an original image and a material image are combined, with a simple operation, which will be described in detail later. Herein, the original image may be a photograph, a pattern, a figure and the like. The material image may be a photograph, pattern, and the like or a photograph date of the original image, and may include a character. The character may include any character defined by a character code and may include not only a character for expression a language but also a symbol and a figure.

A scanner 2 for reading a document in executing a facsimile function, a scanner function, or a copy function is provided at an upper portion of the MFP 1. In addition, a printer 3 which is a so-called ink jet printer is provided, as an apparatus that prints an image on recording sheet, in the MFP 1.

The memory card slot 6 is provided on a front surface of the MFP 1. Image data read by the scanner function is stored in a memory card mounted in the memory card slot 6, or original image data is read from the memory card mounted in the memory card slot 6 by the photo capture function and is then displayed on the LCD 5 or printed on a recording sheet.

In addition, a horizontally long operation panel 4 is provided in front of the document cover. An operation key 40, the LCD 5, and a touch panel 7 (refer to FIG. 2) are provided on the operation panel 4. The MFP 1 displays, on the LCD 5, an operation procedure or a state of processing being executed while displaying information corresponding to an operation of the operation key 40 or the touch panel 7.

The touch panel 7 is a kind of input device and is provided on a screen of the LCD 5. When a user designates (touches) the LCD 5 with a finger, the touch panel 7 can detect the designated position as a position designated from the outside to the LCD 5.

Figure 2:
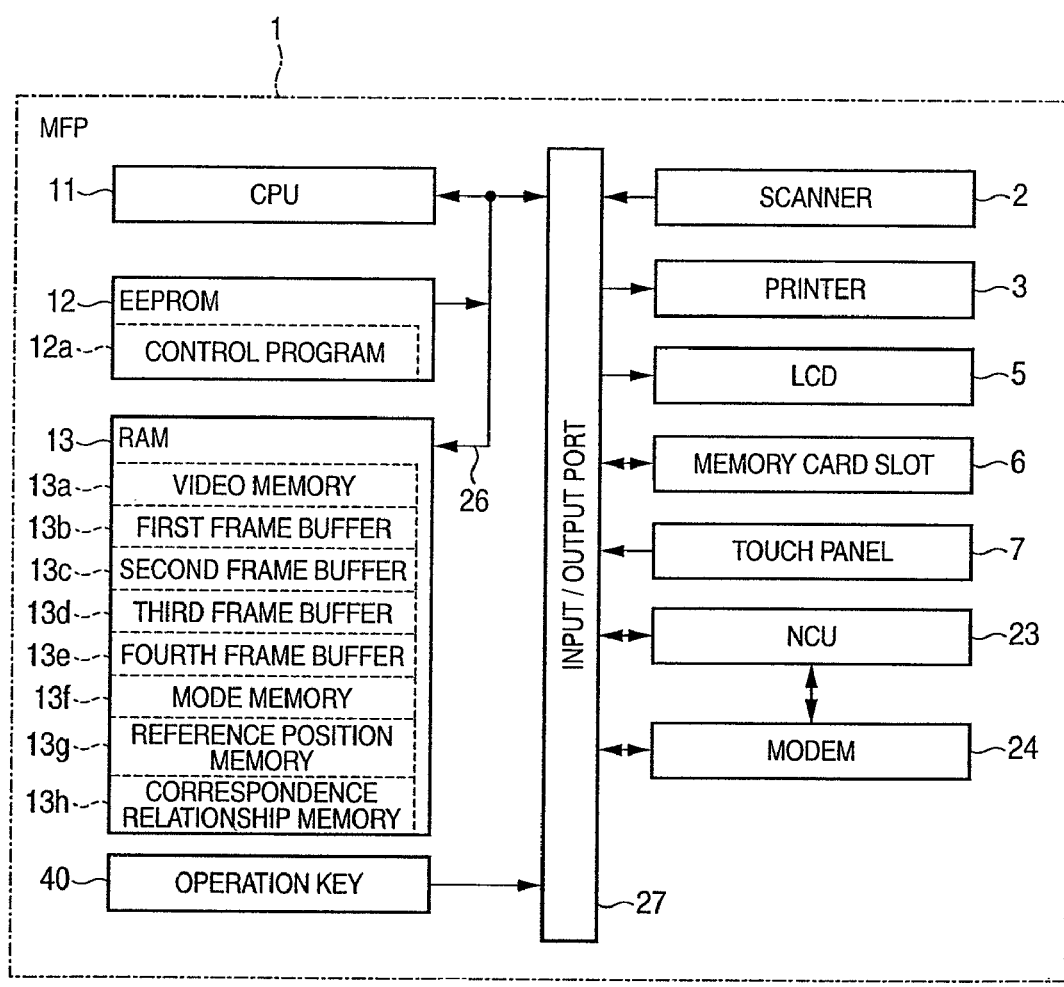
FIG. 2 is a block diagram showing the electrical configuration of the MFP.

Next, an electrical configuration of the MFP 1 will be described with reference to FIG. 2. The MFP 1 mainly includes a central processing unit (CPU) 11, an electronically erasable and programmable read only memory (EEPROM) 12, a random access memory (RAM) 13, the scanner 2, the printer 3, the LCD 5, the memory card slot 6, the touch panel 7, an NCU 23, a modem 24, and the operation key 40.

Among those described above, the CPU 11, the EFPROM 12, and the RAM 13 are connected to one another through a bus line 26. In addition, the scanner 2, the printer 3, the LCD 5, the memory card slot 6, the touch panel 7, the NCU 23, the modem 24, the bus line 26, and the operation key 40 are connected to one another through an input/output port 27.

The CPU 11 controls each function that the MFP 1 has or each portion connected with the input/output port 27 according to a fixed value or program stored in the EEPROM 12 or the RAM 13 or various signals transmitted and received through the NCU 23.

The EEPROM 12 is a nonvolatile memory capable of storing, for example, fixed value data or a control program 12a executed by the CPU 11 so that the fixed value data or the control program 12a can be rewritten and of holding the content even after the power is off. The control program 12a includes a program of flow charts shown in FIGS. 5 to 9B, which will be described later.

The RAM 13 is a memory for temporarily storing various kinds of data when executing various operations of the MFP 1. The RAM 13 includes a video memory 13a, a first frame buffer 13b, a second frame buffer 13c, a third frame buffer 13d, a fourth frame buffer 13e, a mode memory 13f, a reference position memory 13g, and a correspondence relationship memory 13h.

The video memory 13a stores the content displayed on the LCD 5. Data written in the video memory 13a is formed by combination of data (frames) stored in the first fame buffer 13b, the second frame buffer 13c, the third frame buffer 13d, and the fourth frame buffer 13e. The content of the data stored in the video memory 13a and the first to fourth frame buffers 13b to 13e will be described later with reference to FIGS. 4A and 4B.

The mode memory 13f stores which one of a scratch mode, in which images are combined, and a move mode, in which a combined portion is moved, is currently set. The scratch mode and the move mode will be described later with reference to FIGS. 3A to 9B. In addition, the user can set either the scratch mode or the move mode, for example, by inputting an instruction from the operation panel 4.

The reference position memory 13g stores reference positions $B_1$ and $B_2$ determined for a right screen 43 and a left screen 44, respectively, which will be described later with reference to FIGS. 3A to 3D. The correspondence relationship memory 13h stores the correspondence relationship between coordinate information on the right screen 43 and coordinate information on the left screen 44. The reference positions and the correspondence relationship will be described later with reference to FIGS. 3A to 4B.

The NCU 23 is connected to a telephone network (not shown) and controls transmission of a dial signal to the telephone network, response of a call signal from the telephone network, and the like. The modem 24 modulates image data, transmission of which is instructed by the facsimile function, to a signal, which can be transmitted to the telephone network, and transmits the signal through the NCU 23. The modem 24 receives a signal, which is input through the NCU 23 from the telephone network, and displays the signal on the LCD 5 or demodulates the signal to image data recordable by the printer 3.

Next, an edit screen displayed on the LCD 5 of the MFP 1 and a user's operation performed on the screen will be described. As shown in FIGS. 3A to 3D, the MFP 1 first displays an original image 41 based on original image data read from a memory card in a right-half area 43 (hereinafter, referred to as a right screen 43) of a display area of the LCD 5. Then, a material image 42 is displayed in a left-half area 44 (hereinafter, referred to as a left screen 44) of the display area of the LCD 5. The right screen 43 and the left screen 44 have the same shape and size.

In the present exemplary embodiment the right screen 43 and the left screen 44 are managed using common coordinate information by converting the positional information output from the touch panel 7. Specifically, the coordinate system having an X axis in the horizontal direction and a Y axis in the vertical direction are set in a state where a lower left corner of each of the right screen 43 and the left screen 44 is set as an origin, and each position on the screen is managed by coordinate information including an x coordinate and a y coordinate.

Figure 3A:
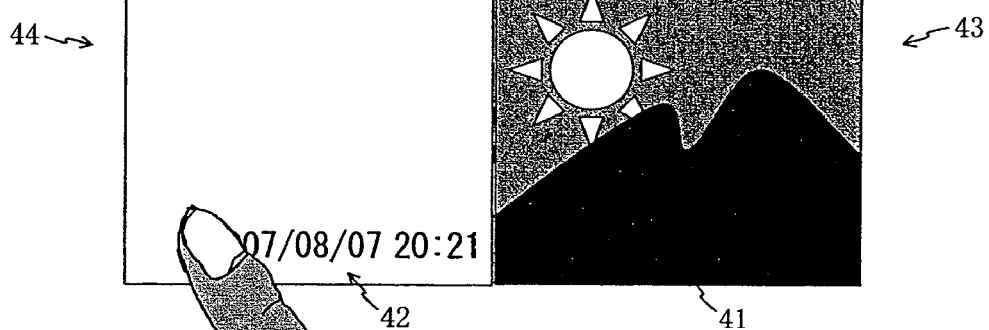
FIGS. 3A to 3D are views showing an edit screen displayed on an LCD and a user's operation performed on the screen.
Figure 3B:
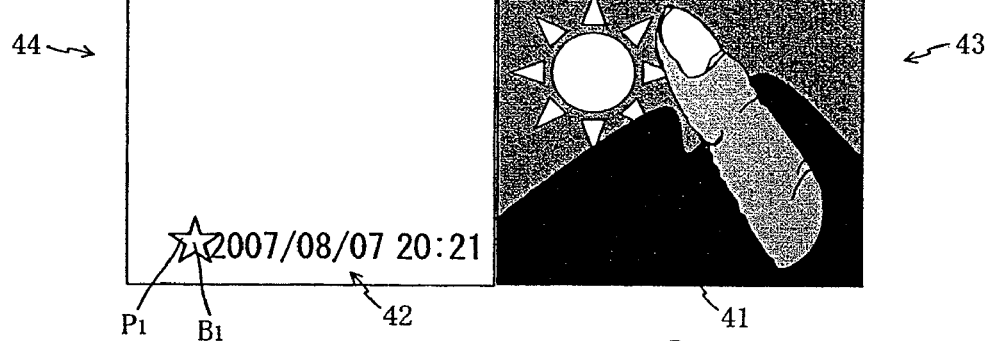

The user's operation on the screen configured as above will now be described. First, the user designates a reference position on each of the right screen 43 and the left screen 44. FIGS. 3A and 3B are views showing an example of an operation of designating a reference position.

First, as shown in FIG. 3A, the user designates (touches) an arbitrary position on the left screen 44. Since coordinate information indicating the designated position can be acquired from a detection result of the touch panel 7, the MFP 1 determines the coordinate information as the reference position 31 of the left screen 44 and stores the coordinate information in the reference position memory 13g (refer to FIG. 2). In addition, when the reference position $B_1$ of the left screen 44 is determined, the MFP 1 displays a pointer image $P_1$ at the reference position $B_1$ (refer to FIG. 3B).

Then, as shown in FIG. 3B, the user designates an arbitrary position on the right screen 43. Similar to the left screen 44, the MFP 1 determines the coordinate information, which indicates the designated position on the right screen 43, as the reference position $B_2$ of the right screen 43 and stores the coordinate information in the reference position memory 13g (refer to FIG. 2). In addition, a pointer image $P_2$ is displayed at the reference position $B_2$.

Figure 3C:
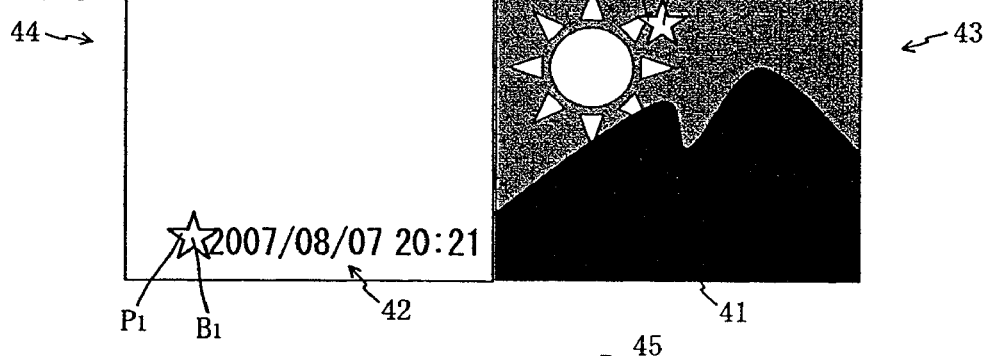

FIG. 3C is a view showing a state where the reference positions $B_1$ and $B_2$ are determined for the left screen 44 and the right screen 43, respectively. Although the processing will be described in detail later, the MFP 1 determines a difference between the coordinate information on the reference position $B_1$ of the left screen 44 and the coordinate information on the reference position $B_2$ of the right screen 43 as the correspondence relationship between the left screen 44 and the right screen 43 and stores the correspondence relationship in the correspondence relationship memory 13h.

Figure 3D:
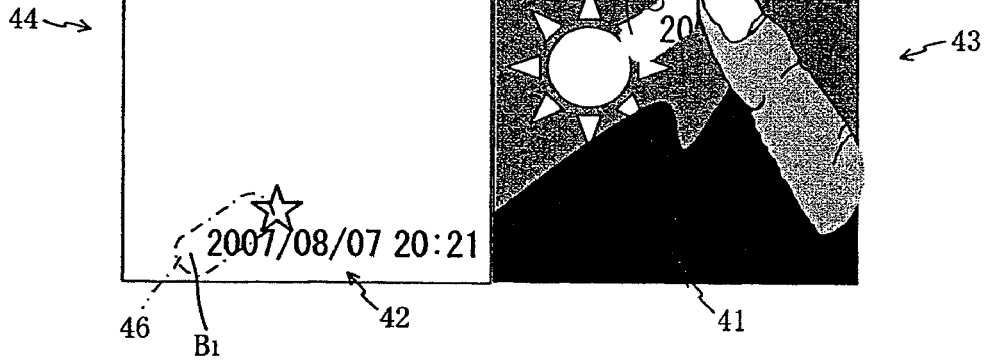

FIG. 3D is a view showing an example of a user's operation of determining an allocation region 45. As shown in FIG. 3D, when the user designates the right screen 43 after determination of the correspondence relationship, the MFP 1 determines a region, which is obtained by adding a predetermined width to the position designated by the user, as the allocation region 45. For example, when the user moves a finger on the right screen 43 in the way of a scratch operation, the designated positions are continuously detected. As a result, the designated positions form a linear locus. Since a predetermined width is added to the locus, the user can easily designate the allocation region 45.

Then, the MFP 1 determines a cut region 46 of the left screen 44 corresponding to the allocation region 45. Here, the cut region 46 corresponding to the allocation region 45 is determined on the basis of the correspondence relationship between the left screen 44 and the right screen 43 stored in the correspondence relationship memory 13h, and details of the processing will be described later with reference to FIG. 6.

Then, a combined image is displayed on the right screen 43 by displaying the material image 42 (that is, a portion of the material image 42 displayed in the cut region 46), which is cut on the basis of the cut region 46, as a partial image in the allocation region 45. In FIG. 3D, the cut region 46 is shown in a dashed-dotted line in order to make the drawing easily understood. However, the dashed-dotted line may not be displayed on the screen.

As described above, when the user moves a finger or the like on the screen, the designated position detected by the touch panel 7 moves. In this case, the MFP 1 sequentially updates and enlarges the allocation region 45 by adding a predetermined width such that the locus of the designated position is included whenever the movement of the designated position is detected. Whenever the allocation region 45 is updated, display of the combined image is updated on the basis of the updated allocation region 45.

Thus, according to the MFP 1, the user can edit the combined image with a simple operation. For example, the user designates one point on the left screen 44, at which a partial image that the user wants to draw in the allocation region 45 is displayed, as the reference position $B_1$, and designates one point on the right screen 43, at which the allocation region 45 is to be provided, as the reference position $B_2$. Thereafter, the user can determine the allocation region 45 with a desired size by a simple operation of enlarging the allocation region 45 while scratching on the right screen 43 with a finger, for example, with the reference position $B_2$ indicated by the pointer image $P_2$ on the right screen 43 as a starting point and can edit a desired combined image obtained by drawing a desired partial image in the allocation region 45.

In addition, according to the MFP 1, since the allocation region 45 is updated such that the locus of the designated position is included, the user can designate the allocation region 45 only by an operation of tracing a portion that the user wants to set as the allocation region 45 on the right screen 43. As a result, even when the user designates a small region, skill of the hands is not required.

Next, a configuration for displaying a combined image on the right screen 43 and the left screen 44 will be described with reference to FIGS. 4A and 4D. FIG. 4A shows a first frame 61, a second frame 62, a third frame 63, and a fourth frame 64. The first frame 61 is data written in the first frame buffer 13b in the RAM 13, the second frame 62 is data written in the second frame buffer 13c, the third frame 63 is data written in the third frame buffer 13d, and the fourth frame 64 is data written in the fourth frame buffer 13e (refer to FIG. 2).

The same coordinate system as the left screen 44 and the right screen 43 is set for each frame, and each position in the frame is managed by coordinate information including an x coordinate and a y coordinate.

As shown in FIG. 4A, the first frame 61 is data for displaying the pointer image $P_1$, and the second frame 62 is data for displaying the pointer image $P_2$ and a partial image 47 drawn in the allocation region 45 (refer to FIGS. 3A to 3D). The third frame 63 is data for displaying the material image 42, and the fourth frame 64 is data for displaying the original image 41. In FIGS. 4A and 4B, the outline of the partial image 47 is shown in a solid line in order to make the drawing easily recognized. However, tee solid line may not be displayed on the screen.

FIG. 4B shows an image displayed on the LCD 5 by overlapping of the first to fourth frames. As shown in FIG. 4B, data for display on the left screen 44 is generated by overlapping (combining) the first and third frames 61 and 63 such that coordinate information of the first frame 61 and coordinate information of the third frame 63 match each other. The first frame 61 is configured to display a transmissive color in the entire region except for a region corresponding to the pointer image $P_1$. Accordingly, by combining of the first frame 61 and the third frame 63, an image in which the pointer image $P_1$ is added to the material image 42 is displayed on the left screen 44.

On the other hand, data for display on the right screen 43 is generated by combining the second frame 62 with the fourth frame 64. The second frame 62 is configured to display a transmissive color in the entire region except for a region corresponding to the partial image 47 and the pointer image $P_2$. Accordingly, by combining of the second frame 62 and the fourth frame 64, a combined image in which the partial image 47 and the pointer image $P_2$ are added to the original image 41 is displayed on the right screen 43.

In the MFP 1, the positional relationship between the second frame 62 and the fourth frame 64 is determined such that the partial image 47 exactly overlaps the allocation region 45 determined on the right screen 43 and overlapping of the frames is performed on the basis of the positional relationship, and details of the processing will be described later.

Next, the above processing that the MFP 1 executes will be described with reference to FIGS. 5 to 9B. At first, an editing processing (S100) will be described with reference to FIG. 5. This editing processing (S100) is processing executed when start of editing of the combined image is instructed by the user, for example, by menu selection from functions that the MFP 1 has.

First, it is determined whether it is selected which original image 41 is to be displayed by the user and an instruction of OK is input by the user or initialization of display of the LCD 5 is selected by the user (S1).

When the determination in step S1 is positive (S1: Yes), the first frame buffer 13b and the second frame buffer 13c are initialized (S2). Then, material image data is generated on the basis of photograph date and time information read from the header of the original image data, for example, and is copied to the third frame buffer 13d (S4). Then, the original image data, which is to be displayed, read from a memory card on the basis of a user's instruction is copied to the fourth frame buffer 13e (refer to FIG. 2) (S6).

Then, the first frame 61 and the third frame 63 are made to overlap each other and are written in a region corresponding to the left screen 44 of the video memory 13a, and the second frame 62 and the fourth frame 64 are made to overlap each other and are written in a region corresponding to the right screen 43 of the video memory 13a (S8). As a result, the original image 41 is displayed on the right screen 43 and the material image 42 is displayed on the left screen 44 (refer to FIG. 3A).

On the other hand, when the determination in step S1 is negative (S1: No), it is then determined whether the reference positions $B_1$ and $B_2$ are determined (S9). When the determination in step S9 is negative (S9: No), the process proceeds to relationship determination processing (S11) in which the correspondence relationship of coordinate information determined on the basis of the reference positions $B_1$ and $B_2$ and the reference positions $B_1$ and $B_2$ is determined. Details of the relationship determination processing will be described later with reference to FIG. 6.

On the other hand, when the determination in step S9 is positive (S9: Yes), it is then determined whether the scratch mode is selected (S10). When the determination in step S10 is positive (S10: Yes), combining processing for editing the combined image is executed as described with reference to FIGS. 3A to 3D (S14), and the process returns to step S1. Details of the combining processing (S14) will be described later with reference to FIG. 7.

On the other hand, when the determination in step S10 is negative (S10: No), the move processing for moving the allocation region 45 is executed (S16), and process returns to step S1. Details of the move processing (S16) will be described later with reference to FIG. 8.

Figure 5:
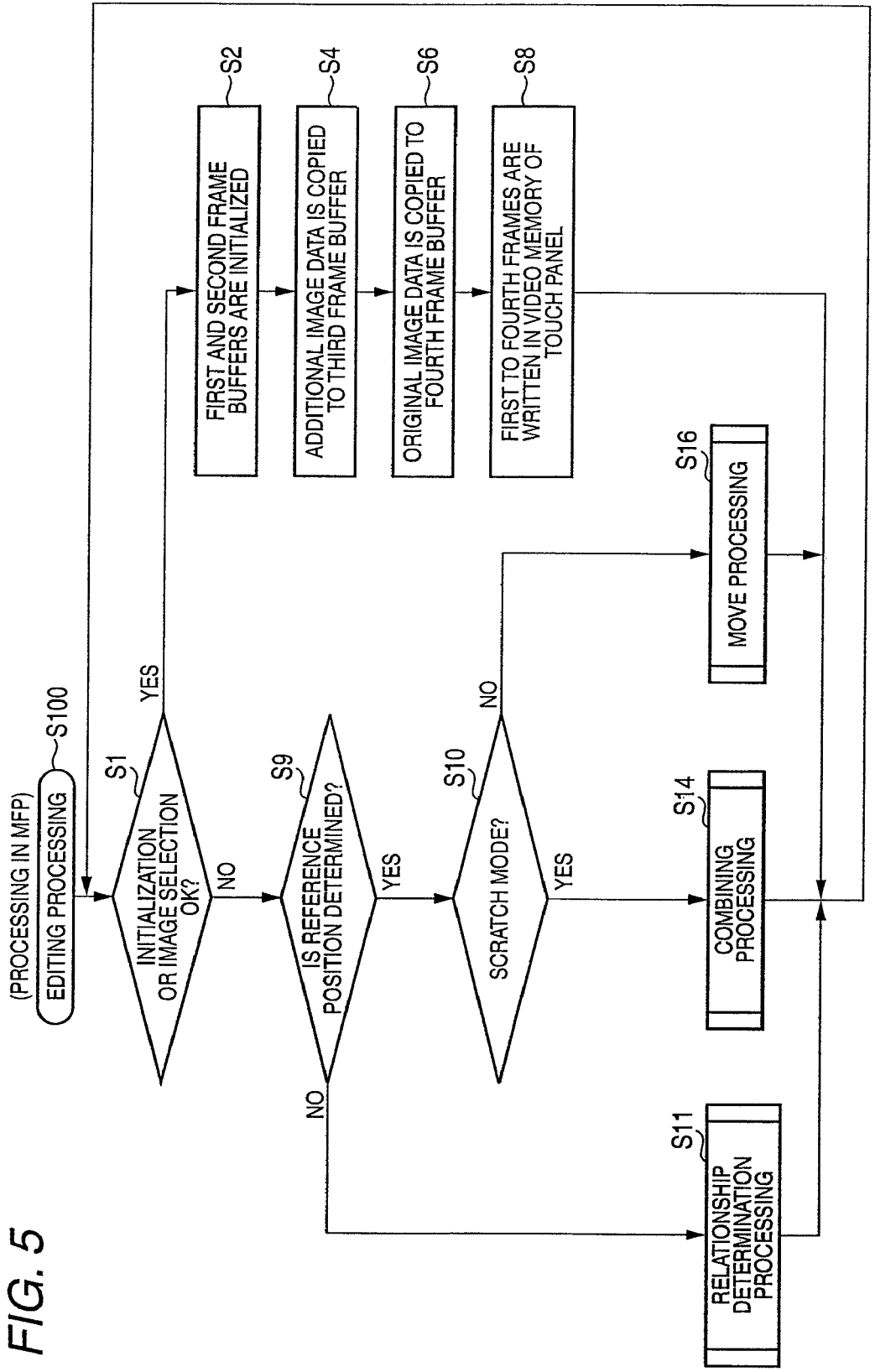
FIG. 5 is a flow chart showing editing processing executed by the MFP.

If the user inputs an instruction to end editing in a state where the combined image is displayed on the right screen 43 of the LCD 5 while the editing processing (S100) shown in FIG. 5 is being executed, the MFP 1 stops the editing processing (S100). Then, data corresponding to the combined image displayed on the right screen 43 is generated on the basis of original image data and material image data, and thereafter, the process proceeds to processing for printing or storing the generated data. Accordingly, the user can edit the combined image while viewing the right screen 43 and can print or store the combined image when a desired combined image is completed. That is, the right screen 43 may be used as a preview screen.

Figure 6:
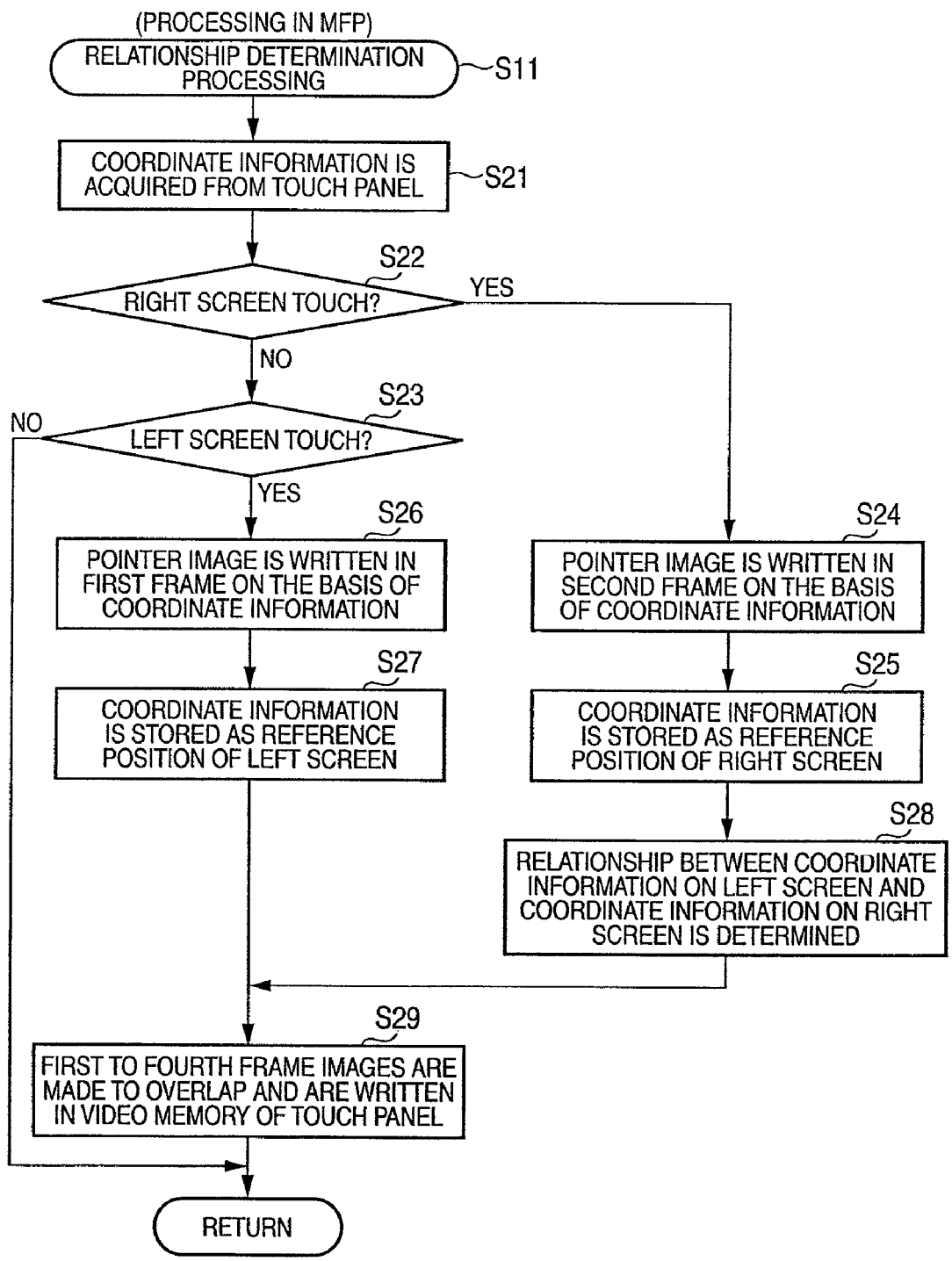
FIG. 6 is a flow chart showing relationship determination processing.

Next, the relationship determination processing (S11) will be described with reference to FIG. 6. The relationship determination processing is processing for determining the reference position $B_1$ of the left screen 44, the reference position $B_2$ of the right screen 43, and the correspondence relationship between the left screen 44 and the right screen 43.

First, coordinate information indicating the designated position on the LCD 5 is acquired on the basis of a detection result of the touch panel 7 (S21). Then, it is determined whether the right screen 43 is touched (S22). Here, for the convenience of explanation, a case where the MFP 1 according to the present exemplary embodiment is configured such that the reference position $B_1$ of the left screen 44 is first designated by the user will be described. Accordingly, since the right screen 43 is not touched by the user at first, the determination in step S22 is negative (S22: No).

However, the MFP 1 may be configured such that the reference position of the right screen 43 is first determined or may be configured such that the user can determine the reference positions in the order that the user likes.

Then, it is determined whether the left screen is touched (S23). When the determination in step S23 is negative (S23: No), the relationship determination processing (S11) ends. On the other hand, when the determination in step S23 is positive (S23: Yes), the pointer image $P_1$ is then written in the first frame 61 on the basis of the acquired coordinate information (S26). Then, the acquired coordinate information is determined as the reference position $B_1$ of the left screen 44 and is stored in the reference position memory 13g (refer to FIG. 2) (S27).

Then, the first to fourth frames 61 to 64 are made to overlap in the combination described with reference to FIGS. 4A and 4B (S29), and the process ends. Since the correspondence relationship between the coordinate information on the left screen 44 and the coordinate information on the right screen 43 is not set at this point of time, the frames overlap each other such that the coordinate information match each other. As a result, the pointer image $P_1$ is displayed on the left screen 44 of the LCD 5 as described with reference to FIG. 3B.

Then, in the relationship determination processing (S11) executed subsequently, when the right screen 43 is touched (S22: Yes), the pointer image $P_2$ is written in the second frame 62 on the basis of the coordinate information on the reference position $B_1$ of the left screen 44 determined previously (S24). That is, the touch position on the right screen 43 is determined as the reference position $B_2$ of the right screen 43, and the pointer image $P_2$ for displaying the pointer image $P_2$ there is written in the second frame 62.

The second frame 62 for displaying the pointer image $P_2$ and the fourth frame 64 for displaying the original image 41 of the right screen 43 are made to overlap each other such that one point in the second frame 62 specified by the coordinate information on the reference position $B_1$ of the left screen 44 overlaps one point in the fourth frame 64 specified by the coordinate information on the reference position $B_2$ of the right screen 43, which will be described in detail later.

Therefore, in processing of step S24, it is assumed that the pointer image $P_2$ is written at the position in the second frame 62 specified by the coordinate information on the reference position $B_1$. In this manner, the frames are made to overlap such that one point in the second frame 62 specified by the coordinate information on the reference position $B_1$ of the left screen 44 overlaps one point in the fourth frame 64 specified by the coordinate information on the reference position $B_2$ of the right screen 43. As a result, an image in which the pointer image $P_2$ is disposed can be displayed at the reference position $B_2$ of the right screen 43.

Then, the acquired coordinate information is determined as the reference position $B_2$ of the right screen 43 and is stored in the reference position memory 13g (refer to FIG. 2) (S25). Then, the correspondence relationship between a position of the left screen 44 and a position of the right screen 43 is determined such that the reference position $B_1$ of the left screen 44 and the reference position $B_2$ of the right screen 43 correspond to each other, and the correspondence relationship is stored in the correspondence relationship memory 13h (refer to FIG. 2) (S28). Specifically, a difference obtained by subtracting the coordinate information on the reference position $B_1$ of the left screen 44 from the coordinate information on the reference position $B_2$ of the right screen 43 is determined as the correspondence relationship between the left screen 44 and the right screen 43 and is stored. For example, when idle coordinate information on the reference position $B_2$ of the right screen 43 is (100, 100) and the coordinate information on the reference position $B_1$ of the left screen 44 is (20, 50), the difference (80, 50) is determined as the correspondence relationship. Hereinafter, the coordinate information (difference) for matching the reference position of the left screen 44 with the reference position of the right screen 43 is described as the 'correspondence relationship'.

Then, the first to fourth frames 61 to 64 are made to overlap in the combination described with reference to FIGS. 4A and 4B (S29), and the process ends. At this point of time, the correspondence relationship between the coordinate information on the left screen 44 and the coordinate information on the right screen 43 is already set. Accordingly, the second frame 62 and the fourth frame 64 overlap each other according to the correspondence relationship (difference) stored in the correspondence relationship memory 13h.

For example, if the difference is (80, 50), the second frame 62 and the fourth frame 64 overlap each other in such a positional relationship that the origin of the second frame 62 matches the coordinate information (80, 50) of the fourth frame 64. In his manner, the second frame 62 and the fourth frame 64 overlap each other such that one point of the second frame 62 specified by the coordinate information (for example, (20, 50)) on the reference position $B_1$ of the left screen 44 overlaps one point of the fourth frame 64 specified by the coordinate information on the reference position $B_2$ of the right screen 43. On the other hand, the first frame 61 and the third frame 63 overlap each other such that coordinate information on the first frame 61 matches coordinate information on the third frame 63. As a result on the LCD 5, the pointer image $P_1$ is displayed at the reference position $B_1$ of the left screen 44 and the pointer image $P_2$ is displayed at the reference position $B_2$ of the right screen 43 as described with reference to FIG. 3C.

Then, in combining processing (S14) executed after the relationship determination processing (S11), the processing is performed while maintaining the positional relationship between the second frame 62 and the fourth frame 64.

Figure 7:
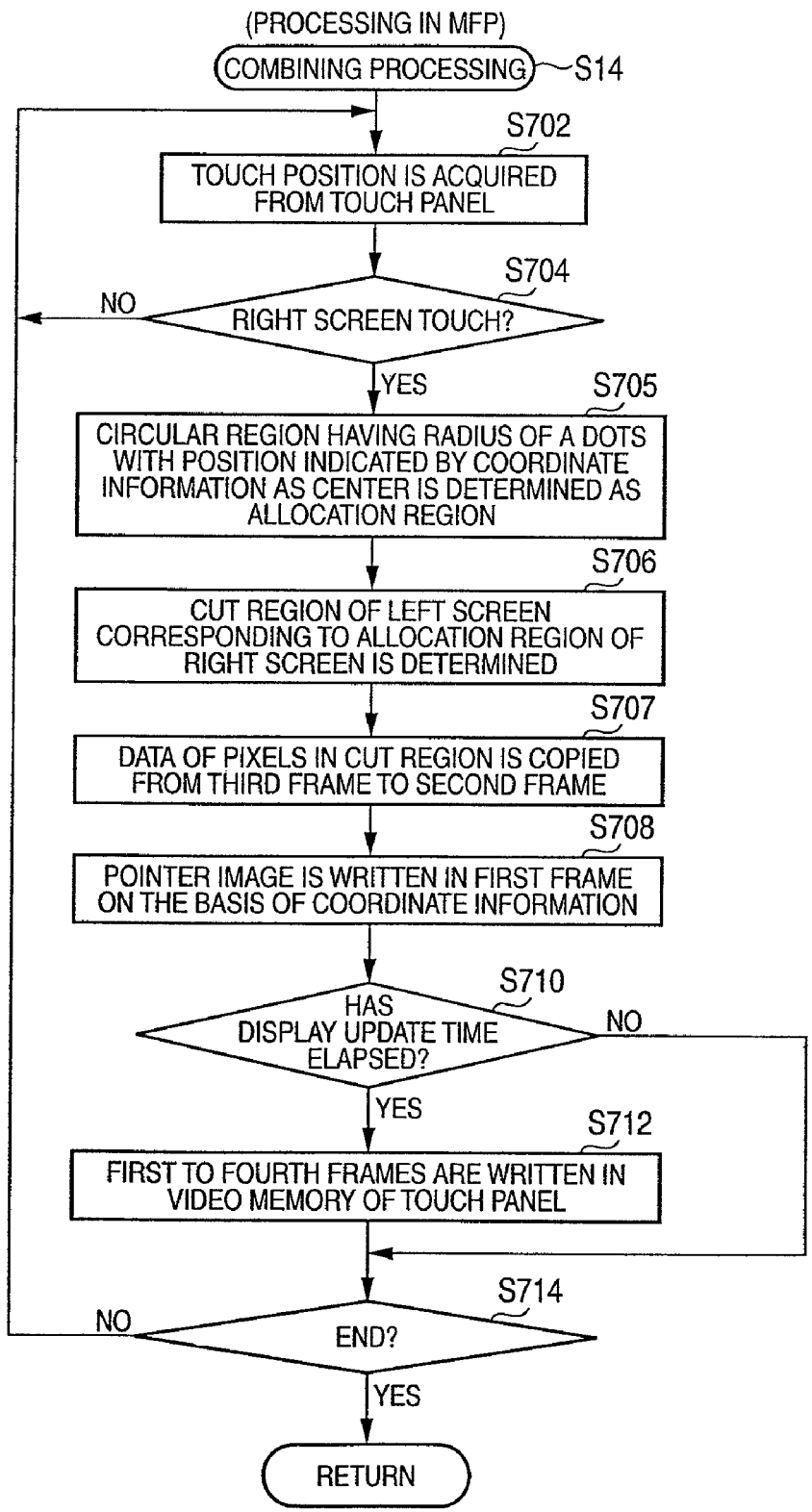
FIG. 7 is a flow chart showing combining processing.

FIG. 7 is a flow chart showing the combining processing (S14) executed by the MFP 1. In the combining processing (S14), a touch position (designated position) detected by the touch panel 7 is first acquired (S702). Then, it is determined whether the right screen 43 of the LCD 5 is touched (operated by the user) on the basis of the acquired touch position (S704). When the determination in step S704 is positive (S704: Yes), coordinate information (xr, yr) indicating the touch position on the right screen 43 is then calculated on the basis of the touch position and the allocation region 45 (refer to FIGS. 3A to 3D), which is a circular region having a radius of A dots (region obtained by giving a predetermined width to the designated position) with a position indicated by the coordinate information (xr, yr) as a center, is determined (S705).

Then, the cut region 46 (refer to FIGS. 3A to 3D) of the left screen 44 corresponding to the allocation region 45 is determined on the basis of the correspondence relationship determined by the relationship determination processing (refer to FIG. 6) (S706). For example, the coordinate information that specifies the cut region 46 can be acquired by subtracting the correspondence relationship (difference) stored in the correspondence relationship memory 13h from the coordinate information that specifies the allocation region 45.

Then, data of pixels included in the cut region 46 is read from the third frame 63 and is copied to the second frame 62 as data of pixels included in the partial image 47 (S707). In addition, data for displaying the pointer image $P_1$ at the position of the left screen 44 corresponding to the position indicated by the coordinate 30 information (xr, yr) is written in the first frame (S708). In this manner, a position of the left screen 44 corresponding to a designated position of the right screen 43 is shown by the pointer image $P_1$. Accordingly, since the user can view the position of the left screen 44 corresponding to the position that the user has designated on the right screen 43, the user can easily perform an operation for determining the allocation region 45 in subsequent operations.

Then, it is determined whether a display update time set beforehand has elapsed (S710). When the determination in step S710 is positive (S710: Yes), the first frame 61 and the third frame 63 are made to overlap each other and are written in a region corresponding to the left screen 44 of the video memory 13*a*, and the second frame 62 and the fourth frame 64 are made to overlap each other in the positional relationship based on the correspondence relationship stored in the correspondence relationship memory 13*h* and are written in a region corresponding to the right screen 43 of the video memory 13*a* (S712). As a result, the combined image described with reference to FIG. 3D is displayed on the right screen 43. On the other hand, when the determination in step S710 is negative (S710: No), processing of step S712 is skipped to proceed to processing of step S714.

Then, it is determined whether the user instructs to end the combining processing (S14) (S714). This is determined on the basis of whether end of editing is input by the user, for example. When the determination in step S714 is negative (S714: No), the process returns to step S702 to repeat the processing. As a result, the allocation region 45 is sequentially updated according to a user's change of designated position and the display of the material image 42 in the allocation region 45 is updated on the basis of the updated allocation region 45, such that the combined image is updated. Since such an update of display was described in detail with reference to FIGS. 3A to 3D, a detailed explanation thereof will be omitted.

When the determination in step S714 is positive (S714: Yes) while repeating the processing, the combining processing (S14) ends. According to the combining processing, a combined image in which a partial image cut from the material image 42 is drawn in the allocation region 45 determined by a user's operation can be displayed on the right screen 43.

Next the move processing (S16) will be described with reference to FIG. 8. The move processing (S16) is processing for making the user designate a change portion reference position and a position after change, and move the allocation region 45. The move processing is executed in setting a move mode. However, even when setting the move mode, the processing is omitted in a state where the partial image 47 is not displayed on the right screen 43, that is, when display of a combined image based on the combining processing is not performed. The correspondence relationship set when performing combining display of the partial image 47 is stored in the correspondence relationship memory 13*h*.

First, a touch position (designated position) detected by the touch panel 7 is acquired (S41). Then, it is determined whether the right screen 43 of the LCD 5 is touched (operated by the user) on the basis of the acquired touch position (S42). When the determination in step S42 is negative (S42: No), the process ends.

On the other hand, when the determination in step S42 is positive (S42: Yes), it is then determined whether the change portion reference position is determined (S46). Since the determination is negative (S46: No) at first, the number of times of touch (that is, the number of times of touch on the same place) is determined (S47). When the number of times of touch is determined to be '2n−1' times ('n' is one or more integers) (S47: '2n−1' times), the pointer image P$_2$ is written in the second frame 62 on the basis of the touch position (S52). Moreover, in the processing of step S52, the second frame 62 and the fourth frame 64 are made to overlap each other according to the correspondence relationship stored in the correspondence relationship memory 13*h* (refer to FIG. 4B). Accordingly, the coordinate information on the touch position on the right screen 43 is converted into the coordinate information on the second frame 62 according to the correspondence relationship, and the pointer image P$_2$ is written in the second frame 62 on the basis of the converted coordinate information.

Then, the first frame 61 and the third frame 63 are made to overlap each other and are written in a region corresponding to the left screen 44 of the video memory 13*a*, and the second frame 62 and the fourth frame 64 are made to overlap each other in the positional relationship based on the correspondence relationship stored in the correspondence relationship memory 13*h* and are written in a region corresponding to the right screen 43 of the video memory 13*a* (S53). In this way, the pointer image P$_2$ is displayed at the touch position of the right screen 43.

On the other band, when the number of times of touch is determined to be '2n' times (S47: '2n' times), the pointer image P$_2$ is written in the second frame 62 on the basis of the touch position (S48). Then, the coordinate information on the touch position is stored, as the change portion reference position of the right screen 43, in the reference position memory 13*g* (refer to FIG. 2) (S49). Then, the first to fourth frames 61 to 64 are made to overlap and are written in the video memory 13*a* (S53). In this way, the pointer image P$_2$ is displayed at the touch position of the right screen 43.

Figure 9A:
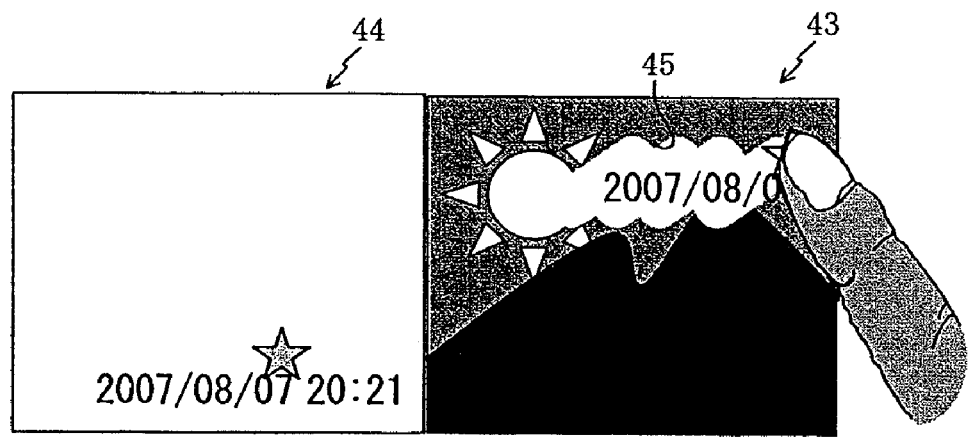
FIG. 9A is a view showing a state before the position of an allocation region is changed.

A state before the position of an allocation region is changed is shown in FIG. 9A. As shown in FIG. 9A, the pointer image P$_2$ is made to only move when the touch is performed '2n−1' times, but the change portion reference position is determined in addition to the movement of the pointer image P$_2$ when the touch is performed '2n' times. Accordingly, for example, the user can display the pointer image P$_2$ by single clicking and designate a desired change portion reference position by double clicking if it is determined that a desired position can be designated.

In addition, a display color of the pointer image P$_2$ may be changed when the change portion reference position is determined. In this case, the user can see that the change portion reference position is determined.

Referring back to FIG. 8, the explanation continues. When the change portion reference position is determined as described above, the determination in step S46 becomes positive (S46: Yes). Then, the pointer image P$_2$ is written in the second frame 62 on the basis of the touch position (S50). Then, the touch position is set as a position after change, and the movement amount of the second frame 62 is determined such that the second frame 62 moves, by the distance from the change portion reference position determined previously to the position after change, with respect to the fourth frame 64 (S51). Specifically, a value obtained by subtracting the coordinate information on the change portion reference position from the coordinate information on the position after change is calculated as the movement amount of the second frame 62. That is, although the reference positions B$_1$ and B$_2$ of the left screen 44 and the right screen 43 are determined by the relationship determination processing (S11) and the second frame 62 and the fourth frame 64 are made to overlap each other according to the correspondence relationship based on the reference positions B$_1$ and B$_2$, the positional relationship between the second frame 62 and the fourth frame 64 in the overlapping is changed by moving the second frame 62 by the movement amount calculated as described above.

Then, the second fame 62 and the fourth frame 64 are made to overlap in the positional relationship based on the movement amount of the second frame 62 determined in the processing of step S51 and are written in the video memory 13a (S53).

Figure 9B:
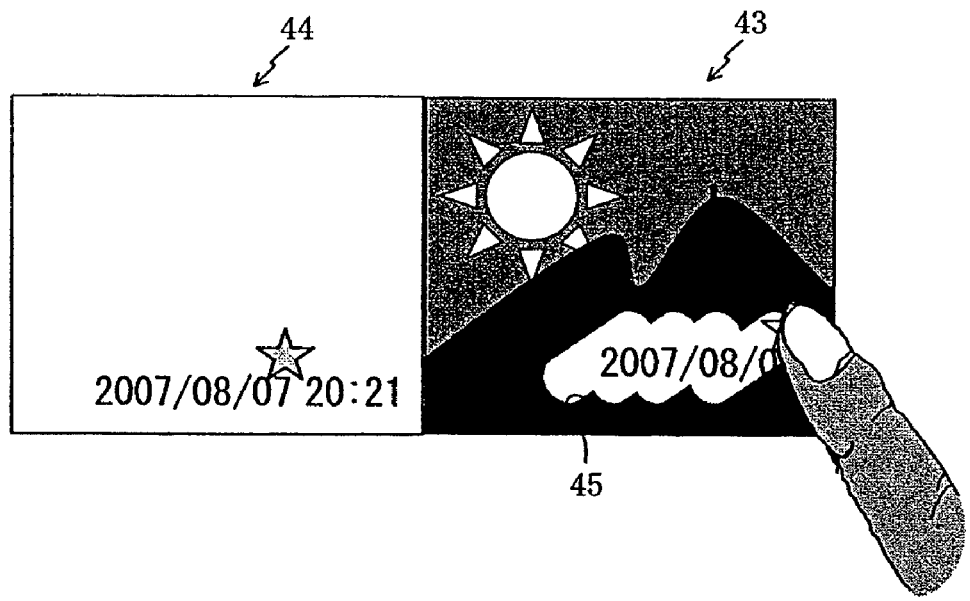
FIG. 9B is a view showing a state after the position of an allocation region is changed.

A state after the position of the allocation region 45 is changed is shown in FIG. 9B. As shown in FIG. 9B, according to the move processing (S16), the partial image 47 already displayed on the right screen 43 is moved to the position after change designated by a user's operation while maintaining the shape and size by changing the positional relationship between the second frame 62 and the fourth frame 64. Thus, the user can easily edit the combined image displayed on the LCD 5.

In addition, although the user designates the change portion reference position and the position after change in the move processing (S16), only the position after change may be designated.

In this case, for example, a configuration where a reference point (central point) existing in a partial image is set beforehand and the partial image is moved such that the reference point matches a position, to which the partial image is to be moved, designated by the user may be adopted.

While the present invention has been shown and described with reference to certain exemplary embodiments thereof, it will be understood by those skilled in the art that various changes in form and details may be made therein without departing from the spirit and scope of the invention as defined by the appended claims.

For example, in the MFP 1 according to the above-described exemplary embodiment, the partial image 47 cut from the material image 42 is combined in the original image 41 with the magnification of 100%. Therefore, the MFP 1 according to the above-described exemplary embodiment is configured such that a suitable region in the original image 41 can be designated as a position, at which the partial image 47 is to be combined, while viewing the material image 42 with the same display magnification as the partial image 47 combined in the original image 41.

However, the present invention is not limited to the case where the partial image 47 is combined with the same magnification, but the partial image 47 may be combined in the original image 41 in a state where the partial image 47 is enlarged or reduced.

First Modified Embodiment

A relationship determination processing (S110) according to a first modified embodiment will be described with reference to FIG. 10. The relationship determination processing (S110) shown in FIG. 10 is processing executed instead of the relationship determination processing (S11; refer to FIG. 6) described in the above exemplary embodiment. In addition, the same portions as in the relationship determination processing (S11) described in the above exemplary embodiment are denoted by the same reference numerals, and an explanation thereof will be omitted.

In the relationship determination processing (S110) in the first modified embodiment, a user is made to designate a reference position and a size regulation position on each of the left screen 44 and the right screen 43. Similar to the above-described exemplary embodiment, first, a reference position and a size regulation position are designated on the left screen 44 and then a position is designated on the right screen 43.

In the relationship determination processing (S110) in the first modified embodiment, when the left screen 44 is touched (S23), it is determined the number of times of touch (S111).

When the number of times of touch is '2n' times (S11: '2n' times), the designated position is determined as the reference position $B_1$ and is stored in the reference position memory 13g (refer to FIG. 2) (S26 and S27).

On the other hand, when the number of times of touch is '2n−1' times (S111: '2n−1' times), a pointer image $P_3$ is written in the first frame 61 on the basis of coordinate information on the designated position (S112). Then, the position is determined as a size regulation position $S_1$ of the left screen 44 and the coordinate information is stored in the RAM 13 (refer to FIG. 2) (S113).

Then, the first to fourth frames 61 to 64 are made to overlap in the combination described with reference to FIGS. 4A and 4B (S29), and the process ends. In addition, since the correspondence relationship between the coordinate information on the left screen 44 and the coordinate information on the right screen 43 is not set at this point of time, the frames overlap each other such that the coordinate information match each other.

Figure 11A:
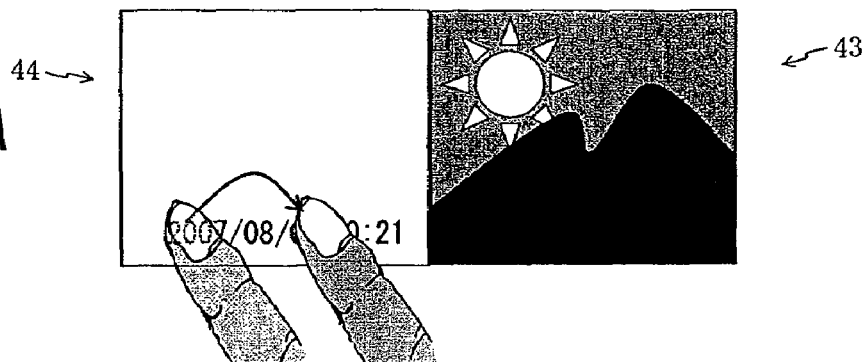
FIGS. 11A to 11F are views showing an example of a screen displayed on the LCD in the relationship determination processing according to the first modified embodiment.
Figure 11B:
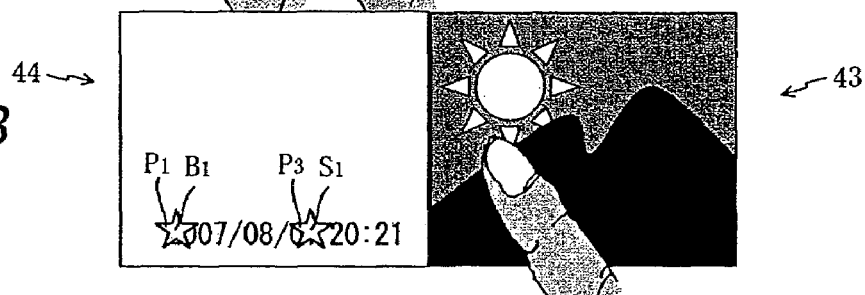

As shown in FIGS. 11A and 11B, when the reference position $B_1$ and the size regulation position $S_1$ of the left screen 44 are determined by a user's operation, the pointer image $P_1$ is displayed at the reference position $B_1$ and the pointer image $P_3$ is displayed at the size regulation position $S_1$.

Referring back to FIG. 10, the explanation continues. Then, when the right screen 43 is touched (S23: Yes), the number of times of touch is determined (S114). When the number of times of touch is '2n' times (S114: '2n' times), the pointer image $P_2$ is written in the second frame 62 (S24). Then, the acquired coordinate information is determined as the reference position $B_2$ of the right screen 43 and is stored in the reference position memory 13g (refer to FIG. 2) (S25).

Then, the correspondence relationship between each position of the left screen 44 and each position of the right screen 43 is determined such that the reference position $B_1$ of the left screen 44 and the reference position $B_2$ of the right screen 43 correspond to each other, and the correspondence relationship is stored in the correspondence relationship memory 13h (refer to FIG. 2) (S28).

Then, the first to fourth frames 61 to 64 are made to overlap in the combination described with reference to FIGS. 4A and 4B3 (S29), and the process ends. In addition, since the correspondence relationship between the coordinate information on the left screen 44 and the coordinate information on the right screen 43 is already determined at this point of time, the second fame 62 and the fourth frame 64 overlap each other in the positional relationship corresponding to the determined correspondence relationship.

On the other hand, when the number of times of touch is '2n−1' times (S114: '2n−1' times), a pointer image $P_4$ is written in the second frame 62 (S115). In addition, at the point of time when the processing of step S115 is performed, the second frame 62 and the fourth frame 64 are made to overlap each other according to the correspondence relationship determined in the processing of step S28. Therefore, the coordinate information on the touch position on the right screen 43 is converted into the coordinate information on the second frame 62 according to the correspondence relationship, and the pointer image $P_4$ is written at a position specified by the coordinate information. Then, the position touched '2n−1' times by the user is determined as the size regulation position $S_2$ of the right screen 43 and the coordinate information is stored in the RAM 13 (refer to FIG. 2) (S116).

Then, the magnification applied to a partial image is determined according to the size relationship between a distance from the reference position $B_1$ to the size regulation position $S_1$ on the left screen 44 and a distance from the reference position $B_2$ to the size regulation position $S_2$ on the right screen 43 (S117).

Specifically, the magnification is determined in the following expression, for example.

$$\text{Magnification} = (X_{S2} - X_{S2})/(X_{S1} - X_{B1}) \quad \text{(Expression)}$$

Here, $(X_{S2} - X_{S2})$ is a value obtained by subtracting an x coordinate of the reference position $B_2$ from an x coordinate of the size regulation position $S_2$ of the right screen 43, and $(X_{S1} - X_{S1})$ is a value obtained by subtracting an x coordinate of the reference position $B_1$ from an x coordinate of the size regulation position $S_1$ of the left screen 44.

Then, the first to fourth frames 61 to 64 are made to overlap in the combination described with reference to FIGS. 4A and 4B (S29), and the process ends.

Figure 11C:
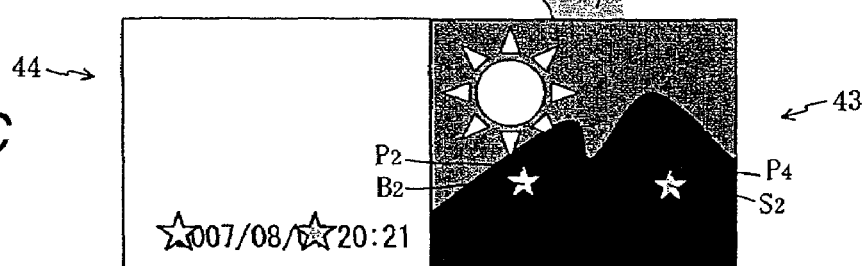

As shown in FIG. 11C, when the reference position 32 and the size regulation position $S_2$ of the right screen 43 are determined, the pointer image $P_2$ is displayed at the reference position $B_2$ and the pointer image $P_4$ is displayed at the size regulation position $S_1$. As described above, since the magnification of the partial image 47 is determined by the distance between the reference position and the size regulation position, the user can intuitively see the determined magnification from a distance between the pointer images on the left screen 44 and a distance between the pointer images on the right screen 43.

Figure 11D:
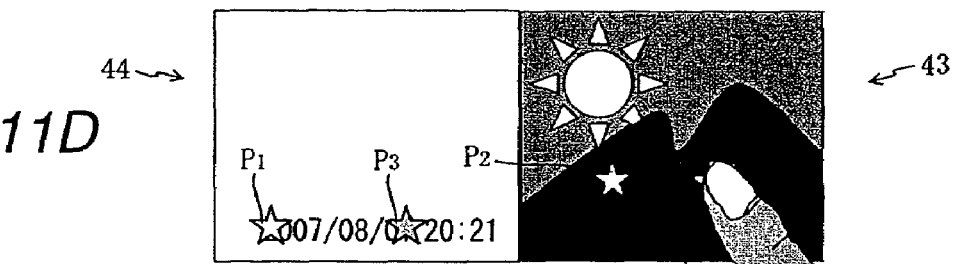
Figure 11E:
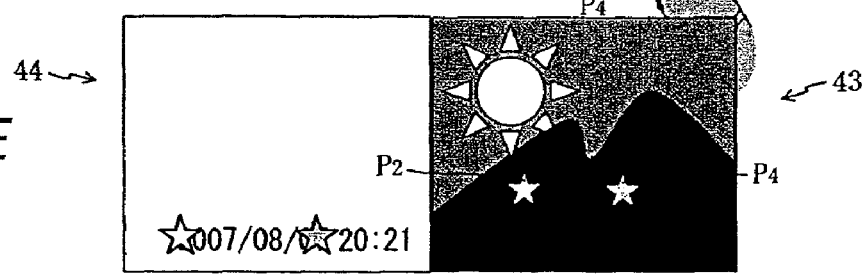

As shown in FIGS. 11D and 11E, if the horizontal distance between the reference position $B_2$ and the size regulation position $S_2$ can be narrowed by redesignating the size regulation position $S_2$ only on the right screen 43, for example, the magnification of the partial image 47 can be made smaller according to the above expression.

Figure 11F:
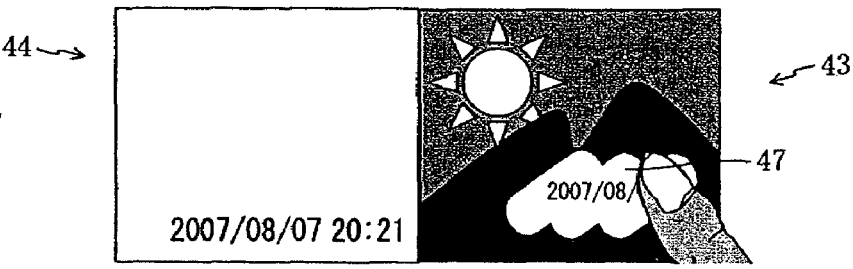

Although the partial image 47 is drawn in the second frame 62 with the same magnification in the combining processing (S14; refer to FIG. 7) executed in the above exemplary embodiment, as shown in FIG. 11F, the partial image 47 is enlarged or reduced with the magnification determined in the processing of step S117 and is drawn in the second frame 62 in the combining processing executed after the relationship determination processing (S110) in this first modified embodiment. However, since the combining processing in this first modified embodiment is similar to the combining processing (S14; refer to FIG. 7) in the above exemplary embodiment except that the magnification is changed, illustration and detailed explanation thereof will be omitted.

As shown in FIG. 11F, according to the first modified embodiment, a combined image in which the enlarged or reduced partial image 47 is drawn in the allocation region 45 can be displayed on the right screen 43 with the magnification determined in the processing of step S117.

Accordingly, the user can obtain a combined image in which the desired partial image 47 is automatically enlarged or reduced according to the size of the allocation region 45, for example, by an operation of designating the desired size of the allocation region 45 by the reference position $B_2$ and the size regulation position $S_2$ and of designating the partial image 47 that the user wants to include in the allocation region 45 by the reference position $B_1$ and the size regulation position $S_1$.

Furthermore, in this first modified embodiment, the magnification is determined on the basis of the horizontal distance between the reference position and the size regulation position on the LCD 5. However, for example, the magnification may also be determined on the basis of the vertical distance between the reference position and the size regulation position when the material image 42 is configured to include vertically written characters.

Second Modified Embodiment

Figure 12:
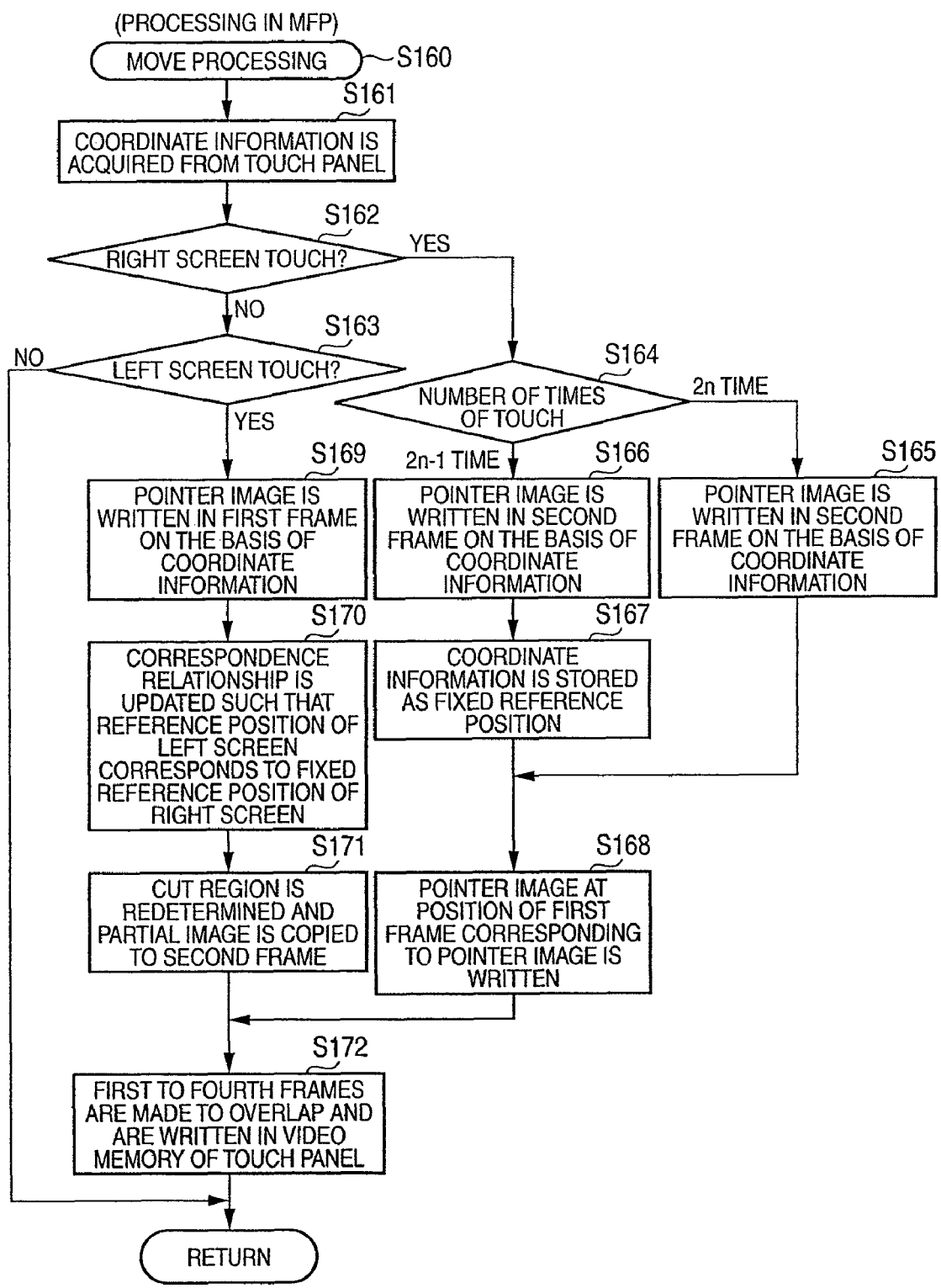
FIG. 12 is a flow chart showing move processing according to a second modified embodiment.

A move processing (S160) in a second modified embodiment will be described with reference to FIG. 12. The move processing (S160) in the second modified embodiment is processing executed instead of the move processing (S16) in the exemplary embodiment described above. Similar to the move processing (S16) in the above exemplary embodiment, the move processing (S160) in the second modified embodiment is executed when the allocation region 45 where the partial image 47 is displayed is displayed on the right screen 43. Therefore, also in this case, the correspondence relationship set when performing combining display of the partial image 47 is stored in the correspondence relationship memory 13h.

First, a touch position (designated position) detected by the touch panel 7 is acquired (S161). Then, it is determined whether the right screen 43 of the LCD 5 is touched (operated by the user) on the basis of the acquired touch position (S162).

When the determination in step S162 is positive (S162: Yes), the number of times of touch is then determined (S164). When the number of times of touch is determined to be '2n−1' times (S164: '2n−1' times), the pointer image $P_2$ is written in the second frame 62 on the basis of the coordinate information (S165). That is, at the point of time when the processing of step S165 is executed, the second frame 62 and the fourth frame 64 are made to overlap each other according to the correspondence relationship stored in the correspondence relationship memory 13h, thereby forming the combined image displayed on the right screen 43. Therefore, the coordinate information on the touch position on the right screen 43 is converted into the coordinate information on the second frame 62 according to the correspondence relationship, and the pointer image $P_2$ is written at a position specified by the coordinate information.

Then, the pointer image $P_1$ is written at a corresponding position of the left screen 44 corresponding to the pointer image $P_2$ (S168). As described above, the reference position $B_1$ of the left screen 44 is determined, the reference position $B_2$ of the right screen 43 is determined, and the correspondence relationship is stored in the correspondence relationship memory 13h. Accordingly, in the processing of step S168, coordinate information specifying the position at which the pointer image $P_1$ is to be written is calculated such that the position of the pointer image $P_2$ with respect to the reference position $B_2$ of the right screen 43 and the position of the pointer image $P_1$ with respect to the reference position $B_1$ of the left screen 44 match each other, and the pointer image $P_1$ is written in the first frame 61 according to the coordinate information. Then, the process proceeds to processing of step S172.

On the other hand, when the number of times of touch is determined to be '2n' times (S164: '2n' times), the pointer image $P_2$ is written in the second frame 62 on the basis of the coordinate information (S166). Similar to those described in the processing of step S165, also at the point of time when the processing of step S166 is executed, the pointer image $P_2$ is written at a position in the second frame 62 specified according to the correspondence relationship stored in the correspondence relationship memory 13h.

Then, the coordinate information is stored, as a fixed reference position of the right screen 43, in the reference position memory 13g (refer to FIG. 2) (S167). Then, the pointer image $P_1$ is written at a position of the first frame 61 corresponding to the pointer image $P_2$ (S168).

Then, the first to fourth frames 61 to 64 are made to overlap and are written in the video memory 13a (S172). In this manner, the pointer image $P_2$ is displayed at the touch position of the right screen 43, and the pointer image $P_1$ is displayed at the position of the left screen 44 corresponding to the touch position of the right screen 43.

Figure 13A:
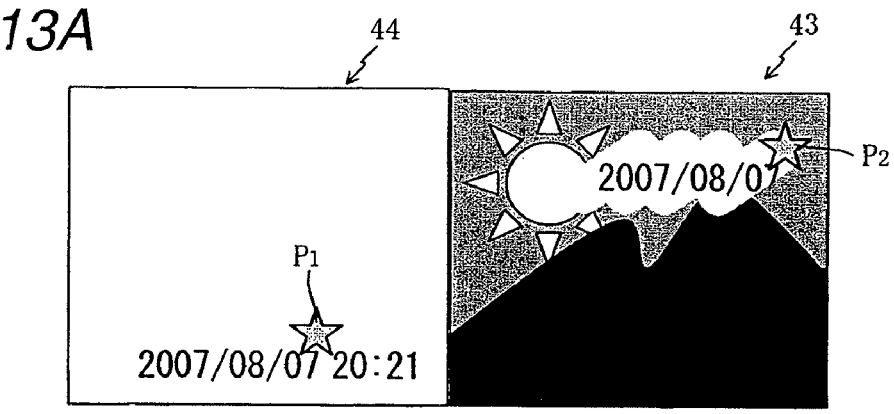
FIGS. 13A to 13C are views showing an example of a screen displayed on the LCD in the move processing according to the second modified embodiment.

In the second modified embodiment, as shown in FIG. 13A, at first, the pointer images $P_1$ and $P_2$ indicating the reference positions $B_1$ and $B_2$ are displayed on the left screen 44 and the right screen 43, respectively.

Figure 13B:
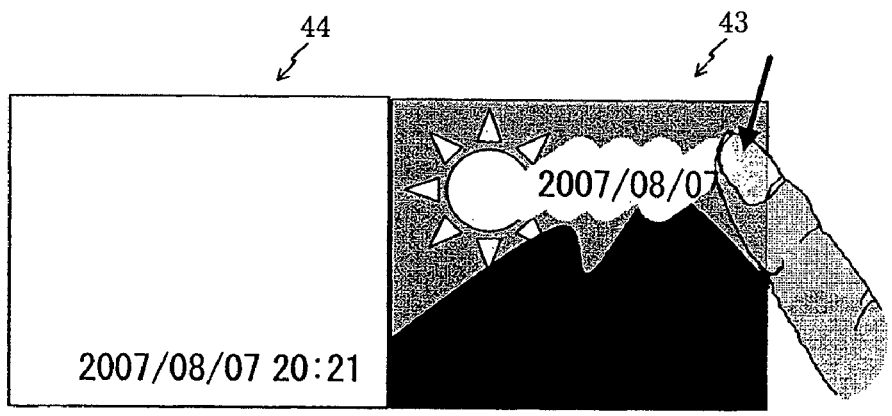

Then, as shown in FIG. 13B, when the pointer image $P_2$ on the right screen 43 is double-clicked (that is, when the pointer image $P_2$ on the right screen 43 is touched '2n' times), for example, the designated position is determined as a fixed reference position. In addition, a display color of the pointer image $P_2$ may be changed when the fixed reference position is determined.

Referring back to FIG. 12, the explanation continues. When the determination in step S162 is negative (S162: No), it is then determined whether the left screen 44 is touched (S163). When the determination in step S163 is negative (S163: No), the process ends.

On the other hand, when the determination in step S163 is positive (S163: Yes), the pointer image $P_1$ is written at a position in the first fame 61 specified by the coordinate information on the touch position on the left screen 44 (S169). Then, the touch position is set as the new reference position $B_1$ of the left screen 44, and the correspondence relationship between the left screen 44 and the right screen 43 is updated such that the new reference position $B_1$ corresponds to the determined fixed reference position (display position of the pointer image $P_2$) on the right screen 43 (S170).

Then, the cut region 46 on the left screen 44 corresponding to the allocation region 45 displayed on the right screen 43 is redetermined on the basis of the correspondence relationship updated in the processing of step S170, and the partial image 47 cut in the redetermined cut region 46 is copied to the second frame 62 (S171).

Then, the second frame 62 and the fount frame 64 are made to overlap in the positional relationship according to the correspondence relationship updated in the processing of step S170 and are written in the video memory 13a (S172). As a result, a combined image, in which the partial image 47 in the redetermined out region 46 is drawn in the allocation region 45 displayed on the right screen 43, is displayed on the right screen 43.

Figure 13C:
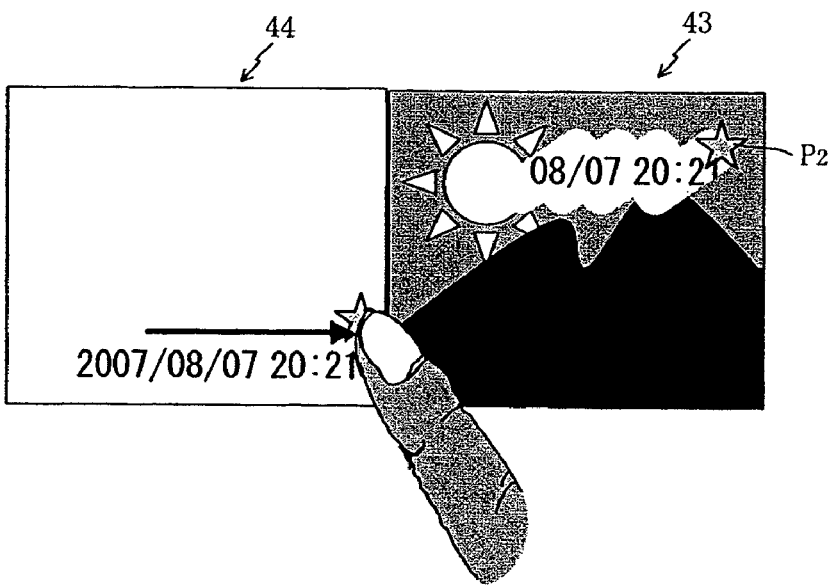

As shown in FIG. 13C, according to the move processing (S160) in the second modified embodiment, an image in which the position and shape of the allocation region 45 are not changed and only the partial image 47 drawn within the allocation region 45 is changed according to a user's operation on the left screen 44 is displayed. Thus, the user can easily edit the combined image displayed on the LCD 5 by execution of the move processing (S160) in the second modified embodiment.

Third Modified Embodiment

Figure 14:
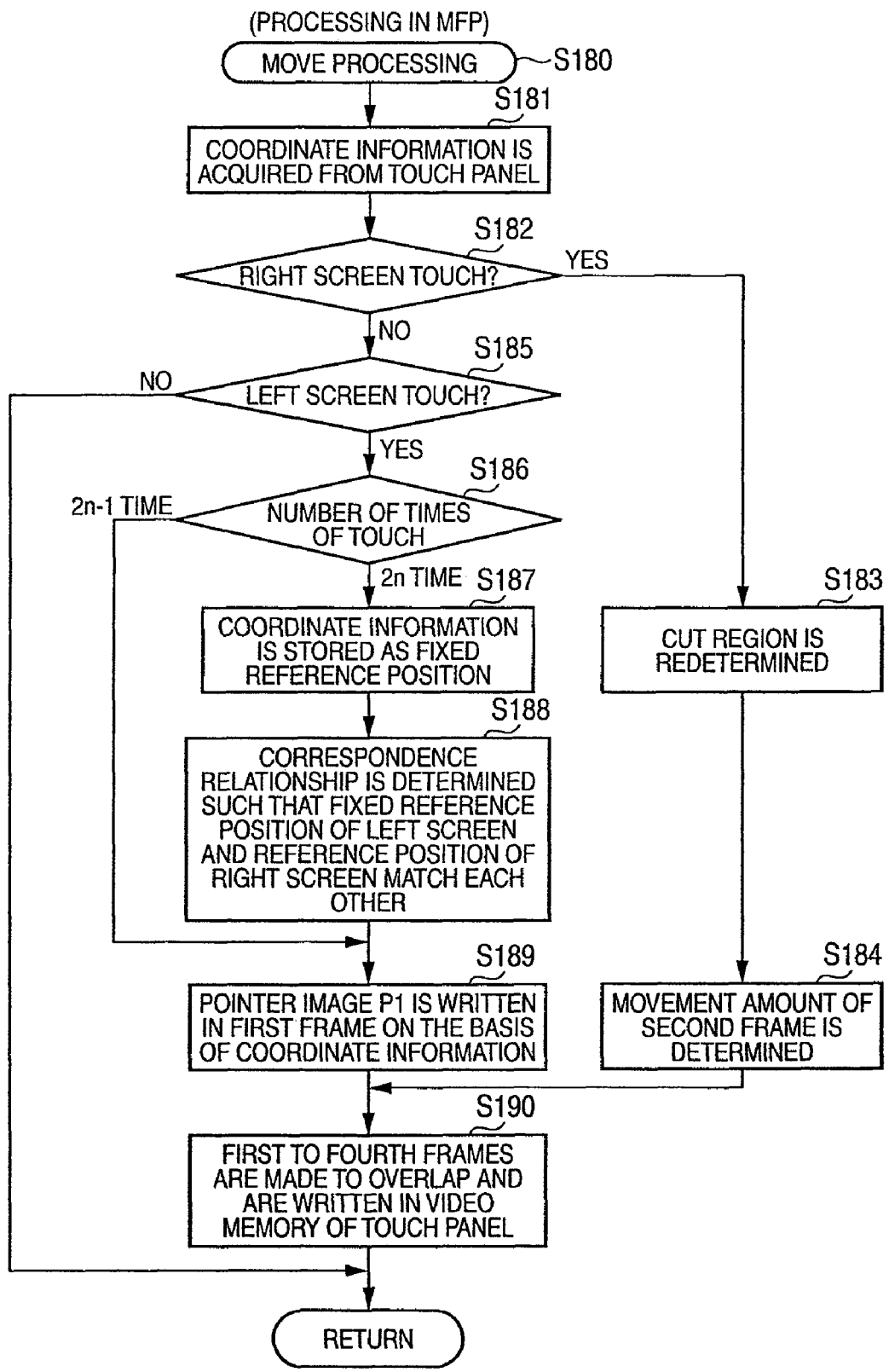
FIG. 14 is a flow chart showing move processing according to a third modified embodiment.

A move processing (S180) according to a third modified embodiment will be described with reference to FIG. 14. The move processing (S180) according to the Third modified embodiment is processing executed instead of the move processing (S16) in the exemplary embodiment described above.

In the move processing (S180) according to the third modified embodiment, a user starts an operation from the left screen 44 at first. Furthermore, similar to the move processing (S116) in the above exemplary embodiment, the move processing (S180) in the second modified embodiment is executed when the allocation region 45 where the partial image 47 is displayed is displayed on the right screen 43. Therefore, also in this case, the correspondence relationship set when performing combining display of the partial image 47 is stored in the correspondence relationship memory 13h and the reference position $B_1$ determined on the left screen 44 and the reference position $B_2$ determined on the right screen 43 are stored in the reference position memory 13g.

First, a touch position (designated position) detected by the touch panel 7 is acquired (S181). Then, it is determined whether the right screen 43 of the LCD 5 is touched (operated by the user) on the basis of the acquired touch position (S182). At first, the determination in step S182 is negative (S182: No). Then, it is determined whether the left screen 44 is touched (S185).

When the determination in step S185 is negative (S185: No), the process ends. On the other hand, when the determination in step S185 is positive (S185: Yes), the number of times of touch on the designated position is determined (S186). When the number of times of touch is '2n−1' times (S186 '2n−1' times), the process proceeds to processing of step S189. In the processing of step S189, the pointer image $P_1$ is written in the first frame 61 on the basis of the coordinate information on the designated position (S189). Then, the first to fourth frames 61 to 64 are made to overlap and are written in the video memory 13a (S190). In this way, the pointer image $P_1$ is displayed at the touch position on the left screen 44.

On the other hand, when the number of times of touch is '2n' times (S186: '2n' times), the coordinate information on the designated position is determined as a fixed reference position of the left screen 44 and is stored in the reference position memory 13g (S187). Then, the correspondence relationship is determined such that the fixed reference position of the left screen 44 and the reference position $B_2$ of the right screen 43 stored in the reference position memory 13g correspond to each other, and the correspondence relationship is stored in the correspondence relationship memory 13h (refer to FIG. 2) (S188). Then, the process proceeds to processing of step S189.

Figure 15A:
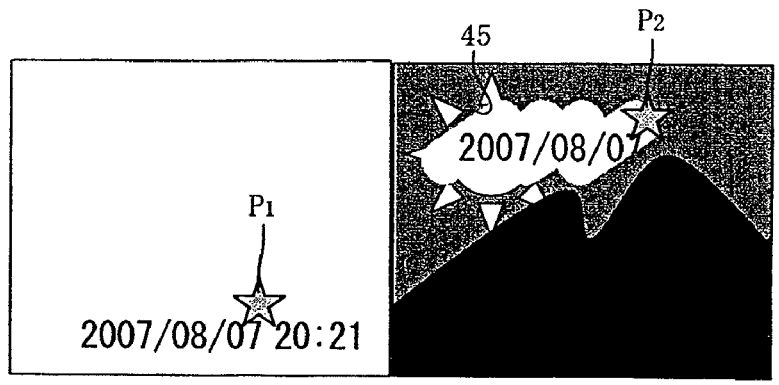
FIGS. 15A to 15C are views showing an example of a screen displayed on the LCD in the move processing according to the third modified embodiment.

In the third modified embodiment, as shown in FIG. 15A, at first, the pointer images $P_1$ and $P_2$ indicating the reference positions $B_1$ and $B_2$ are displayed on the left screen 44 and the right screen 43, respectively.

Figure 15B:
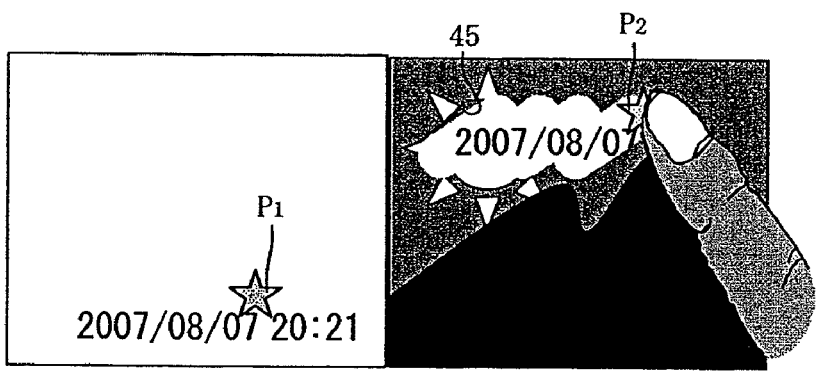

As shown in FIG. 15B, when the pointer image $P_2$ on the left screen 44 is double-clicked (that is, the pointer image $P_2$ on the left screen 44 is touched '2n' times), the position of the pointer image $P_2$ is determined as a fixed reference position. A display color of the pointer image $P_1$ may be changed when the fixed reference position has been determined.

Referring back to FIG. 14, die explanation continues. When the determination in step S182 is positive (S182: Yes), the touch position is set as a position after change of the allocation region 45. In addition, when moving the allocation region 45 determined previously by the distance from the reference position $B_2$ indicated by the pointer image $P_2$ to the position after change, the cut region 46 corresponding to the allocation region 45 after the position change is redetermined and the partial image 47 cut by the cut region 46 is copied to the second frame 62 (S183). That is, the coordinate information on the cut region 46 corresponding to the allocation region 45 after the position change is calculated on the basis of the correspondence relationship determined in the processing of step S188, and the partial image 47 cut by the cut region 46 is copied to a range specified by the coordinate information in the second flame 62. Then, the movement amount of the second fame 62 is determined such that the second frame 62 moves with respect to the fourth frame 64 by an amount corresponding to the movement amount of the allocation region 45 (S184).

Then, the second frame 62 and the fourth frame 64 are made to overlap each other in a state where the positional relationship between the second frame 62 and the fourth frame 64 is changed by moving the second frame 62 by the movement amount determined in the processing of step S184 and are written in the video memory 13a (S190).

Figure 15C:
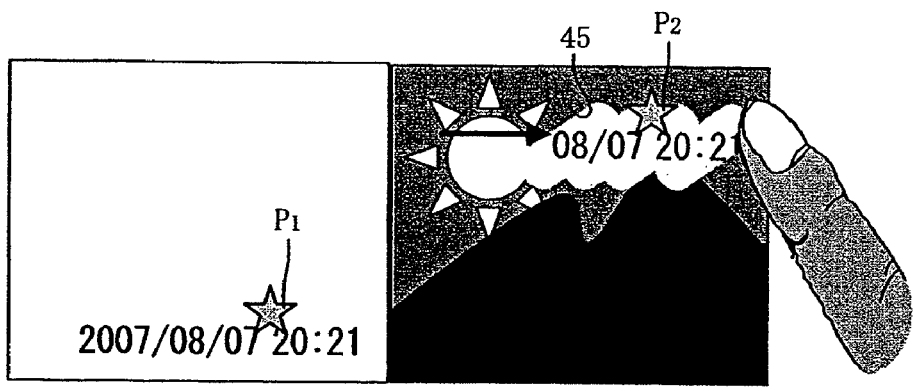

As shown in FIG. 15C, according to the move processing (S180) in the third modified embodiment, the position of the allocation region 45 is changed on the basis of a user's operation, and the cut region 46 corresponding to the allocation region 45 is redetermined and the partial image 47 of the material image 42 in the redetermined cut region 46 is drawn in the allocation region 45 after position change. Accordingly, the user can change the combined image with a sense like sliding only the allocation region 45 in a state where the material image 42 on the back surface side stays unchanged.

Fourth Modified Embodiment

Figure 16:
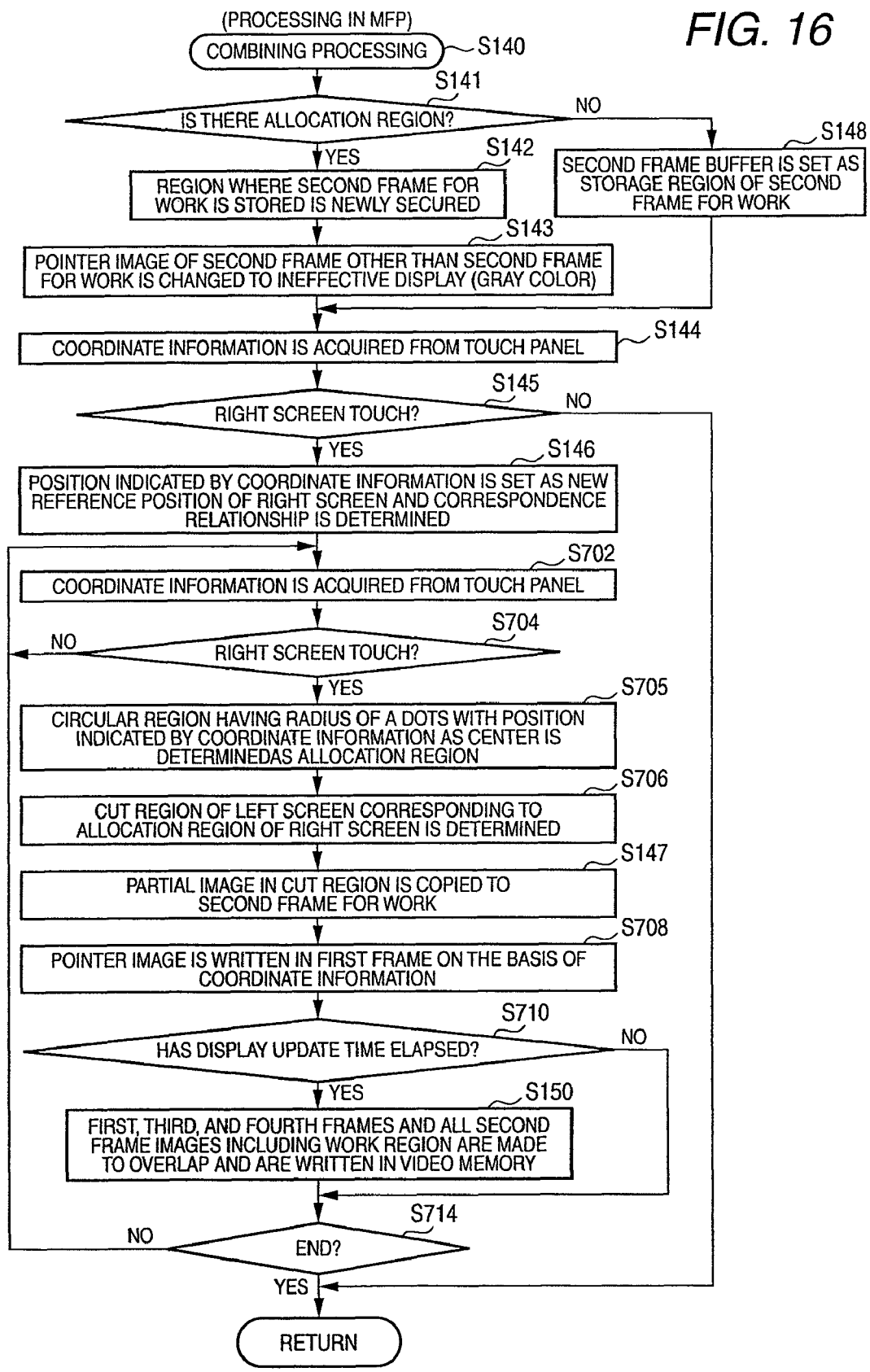
FIG. 16 is a flow chart showing combining processing according to a fourth modified embodiment.

FIG. 16 is a flow chart showing combining processing (S140) in a fourth modified embodiment. The combining processing (S340) in the fourth modified embodiment is processing, in which the second frame 62 is prepared in a plural number when the plurality of allocation regions 45 are set on the right screen 43, and is executed instead of the combining processing (S14) in the exemplary embodiment described above.

Although a detailed explanation is omitted, a table that individually manages the relative positional relationship between the fourth frame 64 and each of the second frames 62 is set in the RAM 13. In the combining processing (S140) in the modified embodiment, the same processing as in the combining processing (S14) in the above-described exemplary embodiment is denoted by the same reference numeral, and an explanation thereof will be omitted.

First, it is determined whether the allocation region 45 is already displayed on the right screen 43 (S141). When the determination in step S141 is negative (S141: No), the second frame buffer 13c prepared beforehand in the RAM 13 is set as a storage region of a second frame for work (S148).

On the other hand, when the determination in step S141 is positive (S141: Yes), a new region is prepared in the RAM 13 and the region is set as a storage region (not shown) of a second frame for work (S142). Then, the pointer image $P_2$ written in the second frame other than the second frame for work is changed to ineffective display, for example, by setting a gray color as the display color (S143).

Figure 17A:
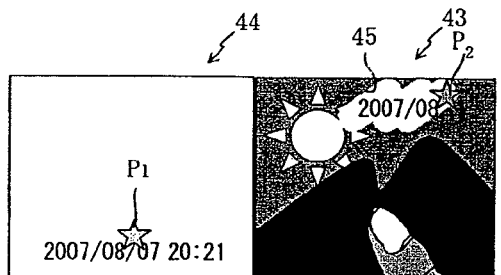
FIGS. 17A to 17F are views showing an example of a screen displayed on the LCD in the combining processing according to the fourth modified embodiment.

FIG. 17A shows an example of a screen displayed on the LCD 5 corresponding to the processing of steps S142 and S143 in the combining processing (S140) according to the fourth modified embodiment.

As shown in FIG. 17A, when the allocation region 45 is already displayed on the right screen 43, the MFP 1 prepares a second frame for work for displaying the pointer image $P_2$ indicating a new designated position and changes the display color of the pointer image $P_2$ displayed originally to thereby make the pointer image $P_2$ ineffective.

Referring back to FIG. 16, the explanation continues. Then, coordinate information is acquired (S144), and it is determined whether a touch on the right screen 43 is detected (S145). When the determination in step S145 is negative (S145: No), the process ends. On the other hand, when the determination in step S145 is positive (S145: Yes), the designated position is set as the new reference position $B_2$ of the right screen 43, the correspondence relationship between the right screen 43 and the left screen 44 is determined on the basis of the new reference position $B_2$, and the new pointer image $P_2$ is drawn at a position corresponding to the designated position of the second frame for work (S146). In addition, when a plurality of second frames are set, the correspondence relationship is stored for every second frame.

Figure 17D:
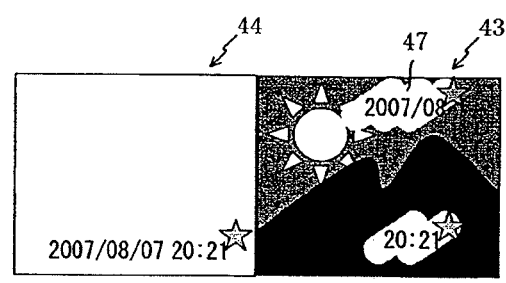
Figure 17B:
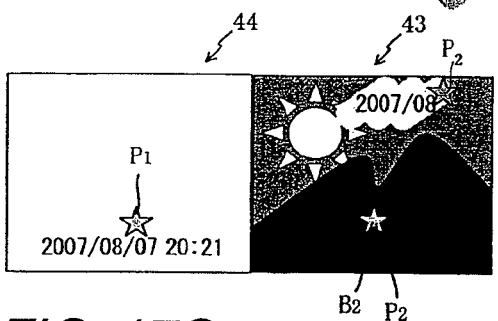

FIG. 17B shows an example of a screen where the pointer image $P_2$ is displayed on the newly determined reference position $B_2$. In this case, only the newly displayed pointer image $P_2$ is effective.

Referring back to FIG. 16, the explanation continues. Then, similar to the exemplary embodiment described above, coordinate information is acquired (S702) and it is determined whether a touch on the right screen 43 is detected (S704). When the determination in step S704 is negative (S704: No), the process returns to step S702 to repeat the processing.

On the other hand, when the determination in step S704 is positive (S704: Yes), the allocation region 45 having the designated position as a center is determined (S705) and the cut region 46 corresponding to the allocation region 45 is determined (S706) similar to the combining processing (S14) in the exemplary embodiment described above. Moreover, in the processing of step S706, the cut region 46 is determined on the basis of the newest correspondence relationship determined in the processing of step S147.

Then, the partial image 47 cut by the cut region 46 is copied to the second frame for work (S147). In the combining processing (S14) in the exemplary embodiment described above, the partial image 47 is drawn in the second frame stored in the second frame buffer 13c. However, the combining processing (S140) in this fourth modified embodiment is different from the combining processing (S14) in the above exemplary embodiment in that the partial image 47 is drawn in the second frame for work.

Then, the same processing as in the above exemplary embodiment is performed (S708 and S710) so that the first to fourth frames are made to overlap in the combination described with reference to FIGS. 4A and 4B and are written in the video memory 13a (refer to FIG. 2) (S150). Here, in the combining processing (S140) in this fourth modified embodiment, all of the second frames generated by then are made to overlap the fourth frame 64, which is different from the combining processing (S14) in the exemplary embodiment described above. In addition, while an instruction to end editing is not inputted, processing from step S702 is repeated.

Figure 17E:
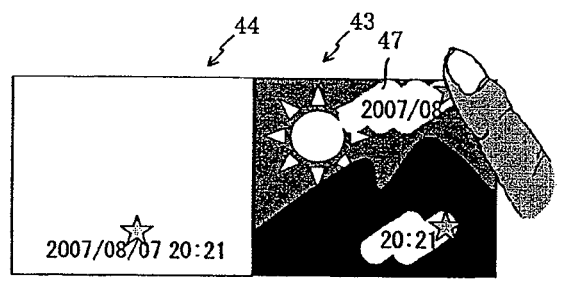
Figure 17C:
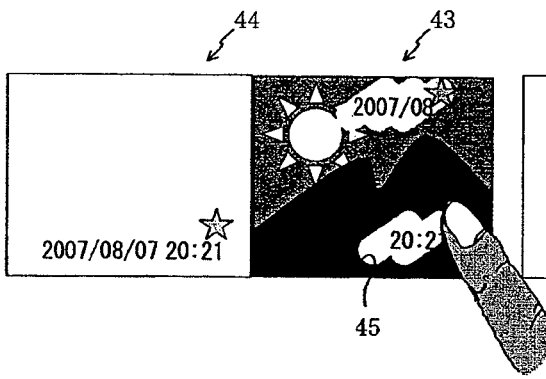

FIG. 17C shows a state where a partial image is drawn in the new allocation region 45. As shown in FIG. 17C, a partial image of a cut region based on the correspondence relationship newly determined by the processing of step S146 is displayed in the new allocation region 45.

FIG. 17D shows a display state after the combining processing ends. As shown in FIG. 17D, a plurality of independent partial images can be combined on the right screen 43. Here, since the partial images are drawn in the corresponding individual second frames as described above, only a desired partial image can be moved with respect to the original image 41. The movement of a partial image is realized by the move processing of FIG. 8 described previously.

FIG. 17E shows an example of move processing. As shown in FIG. 17E, when one pointer image P$_2$ is designated, the designated pointer image P$_2$ and only a second frame in which the pointer image P$_2$ is drawn are made effective. Then, when one point on the right screen 43 is designated, the second frame made effective is moved by a distance from the effective pointer image P$_2$ to the designated one point with respect to the fourth fame.

Figure 17F:
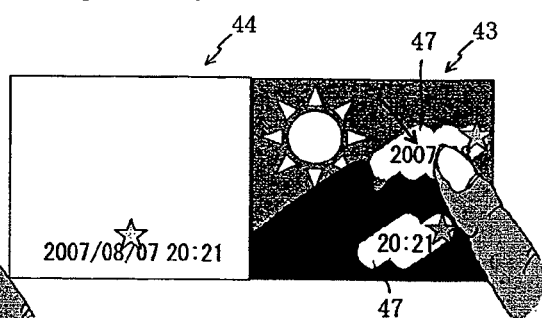

FIG. 17F shows an example of a display state after movement of the partial image 47. As shown in FIG. 17F, only the partial image 47 specified by the effective pointer image P$_2$ moves and the other partial images 47 do not move. As a result, the user can edit the combined image more freely.

What is claimed is:

1. An image processing apparatus comprising:
   an image display unit which displays a material image in a first area of a display device and displays an original image in a second area of the display device;
   a detection unit which receives input to designate a first point in the first area of the display device, a second point in the second area of the display device, and one or more third points in the second area of the display device;
   a relationship determining unit which sets the first point as a first reference position and the second point as a second reference position, and which determines a correspondence relationship between the first reference position and the second reference position, such that the first reference position and the second reference position correspond to each other;
   an allocation region determining unit which determines an allocation region in the second area that is allocated to a partial image cut from the material image based on the one or more third points; and
   a cut region determining unit which determines a cut region in the first area where the partial image is cut from the material image based on the correspondence relationship and the allocation region that is allocated to the partial image;
   wherein the image display unit displays the partial image cut from the material image in the allocation region in the second area of the display device in combination with the original image so as to display a combined image.

2. The image processing apparatus according to claim 1,
   wherein the allocation region determining unit determines the allocation region by adding a width to the one or more third points, and updates the allocation region to include a locus of the one or more third points when the one or more third points are moved, and
   wherein the image display unit updates the display of the combined image based on the updated allocation region as the allocation region is updated by the allocation region determining unit.

3. The image processing apparatus according to claim 1, further comprising:
   a first area position determining unit which determines a position in the first area corresponding to the second point in the second area based on the correspondence relationship determined by the relationship determining unit; and
   a mark display unit which displays a mark in the first area indicating the position determined by the first area position determining unit.

4. The image processing apparatus according to claim 1, further comprising:
   a first area size regulating unit which determines a position in the first area, at which a predetermined operation is performed, as a first size regulation position of the first area; and
   a second area size determining unit which determines a position in the second area, at which a predetermined operation is performed, as a second size regulation position of the second area,
   wherein the relationship determining unit determines a magnification applied to the partial image based on a relationship between a first distance from the first reference position to the first size regulation position in the first area and a second distance from the second reference position to the second size regulation position in the second area, and
   wherein the image display unit displays the partial image in the allocation region with a size that is reduced or enlarged according to the magnification determined by the relationship determining unit.

5. The image processing apparatus according to claim 4,
   wherein the relationship determining unit determines the magnification based on the relationship between the first distance and the second distance in one direction.

6. The image processing apparatus according to claim 1, further comprising:
   a partial image moving unit which, when the detection unit receives input that designates a fourth point in the second area of the display device in a state where the partial image is displayed in the allocation region of the second area, moves the displayed partial image to a position of the fourth point while maintaining a shape and a size of the partial image.

7. The image processing apparatus according to claim 1, further comprising:
   a relationship updating unit which sets, as a new first reference position in the first area, a fourth point designated in the first area with input received by the detection unit in a state where the partial image is displayed in the allocation region, and updates the correspondence relationship such that the new first reference position corresponds to the second reference position; and
   a cut region redetermining unit which redetermines the cut region in the first area to correspond to the allocation region based on the correspondence relationship updated by the relationship updating unit,
   wherein the image display unit displays the partial image cut from the material image in the allocation region based on the cut region redetermined by the cut region redetermining unit.

8. The image processing apparatus according to claim 1, further comprising:
   an allocation position changing unit which changes a position of the allocation region based on a fourth point in the second area received as input by the detection unit in a state where the partial image is displayed in the allocation region; and
   a cut region redetermining unit which redetermines the cut region in the first area to correspond to the allocation region, the position of which is changed by the allocation position changing unit, based on the correspondence relationship determined by the relationship determining unit,
   wherein the image display unit displays the partial image cut from the material image in the allocation region, the position of which is changed, based on the cut region redetermined by the cut region redetermining unit.

9. The image processing apparatus according to claim 1, wherein the image display unit displays an image in the second area based on data obtained by combining an original image layer corresponding to the original image with a partial image layer corresponding to the partial image, the image processing apparatus further comprising a managing unit which, when a plurality of partial image layers are provided, individually manages a positional relationship between the original image layer and each of the partial image layers.

10. A non-transitory computer-readable medium having a computer program stored thereon and readable by a computer including a display device, the computer program, when executed by the computer, causing the computer to perform operations comprising:

receiving input to designate a first point in a first area of the display device, a second point in a second area of the display device, and one or more third points in the second area of the display device;

displaying a material image in the first area of the display device;

displaying an original image in the second area of the display device;

setting the first point as a first reference position;

setting the second point as a second reference position;

determining a correspondence relationship between the first reference position and the second reference position such that the first reference position and the second reference position correspond to each other;

determining an allocation region in the second area that is allocated to a partial image cut from the material image based on the one or more third points;

determining a cut region in the first area where the partial image is cut from the material image based on the correspondence relationship and the allocation region that is allocated to the partial image; and displaying the partial image cut from the material image in the second area of the display device in combination with the original image so as to display a combined image.

* * * * *